United States Patent
Hald et al.

(10) Patent No.: US 11,979,346 B2
(45) Date of Patent: May 7, 2024

(54) METHOD FOR WIRELESS COMMUNICATION IN METER READING SYSTEMS

(71) Applicant: Kamstrup A/S, Skanderborg (DK)

(72) Inventors: Flemming Hald, Skanderborg (DK); Jeppe Hofni, Skanderborg (DK); Mathias Rønholt Kielgast, Skanderborg (DK); Torben Markussen, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 223 days.

(21) Appl. No.: 17/557,903

(22) Filed: Dec. 21, 2021

(65) Prior Publication Data

US 2022/0200749 A1 Jun. 23, 2022

(30) Foreign Application Priority Data

Dec. 23, 2020 (EP) .................................... 20217053

(51) Int. Cl.
*H04L 5/00* (2006.01)
*H04W 72/0446* (2023.01)
*H04W 72/21* (2023.01)

(52) U.S. Cl.
CPC .......... *H04L 5/0046* (2013.01); *H04L 5/0053* (2013.01); *H04W 72/0446* (2013.01); *H04W 72/21* (2023.01)

(58) Field of Classification Search
CPC .... H04L 5/0046; H04L 5/0053; H04W 72/21; H04W 72/0446

(Continued)

(56) References Cited

U.S. PATENT DOCUMENTS

2016/0309469 A1* 10/2016 Shu .................... H04W 56/0015
2019/0319823 A1* 10/2019 Akkarakaran ....... H04B 7/0695

FOREIGN PATENT DOCUMENTS

| EP | 3742656 A1 | 11/2020 |
| KR | 20200107020 A | 9/2020 |
| WO | 2015178937 A1 | 11/2015 |

OTHER PUBLICATIONS

In No Sornin et al: "?2015 LoRa(TM) Alliance", Special or 25 Exemplary, Incidental, Punitive or Consequential Damages of Any Kind, in Contract or 26 in Tort, in Connection With This Document or the Information Contained Herein, Even If, Jan. 31, 2015 (Jan. 31, 2015), pp. 1-82, XP055368264.

* cited by examiner

*Primary Examiner* — Chi Tang P Cheng
(74) *Attorney, Agent, or Firm* — McGlew and Tuttle, P.C.

(57) ABSTRACT

A wireless communication link management method includes sending data in a primary uplink data frame from the measuring device (7) to the data collection unit (5) via a primary channel. After sending, the measuring device provides a time-limited primary access opportunity (AO) for receiving a link management downlink frame. A primary signal quality is evaluated. A secondary uplink frame is sent from the measuring device via a secondary channel. A time-limited secondary access opportunity for receiving a link management downlink frame is provided. Secondary signal qualities are evaluated. One among the primary access opportunity and the secondary access opportunities is selected for sending a link management downlink frame from the data collection unit to the measuring device depending on the signal qualities. The associated channel is used as the primary channel for sending data in a primary uplink data frame from the measuring device to the data collection unit.

16 Claims, 9 Drawing Sheets

(58) Field of Classification Search
USPC .......................................................... 370/329
See application file for complete search history.

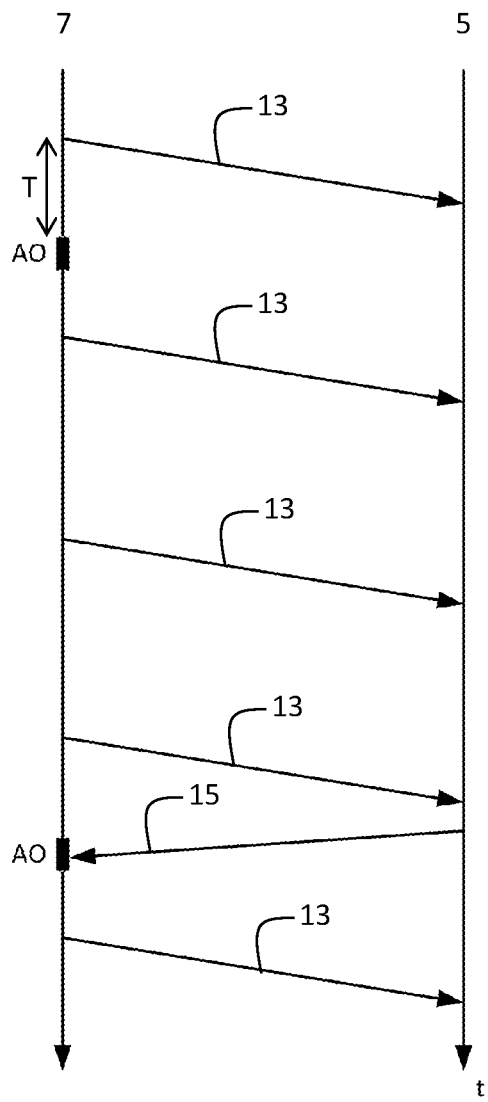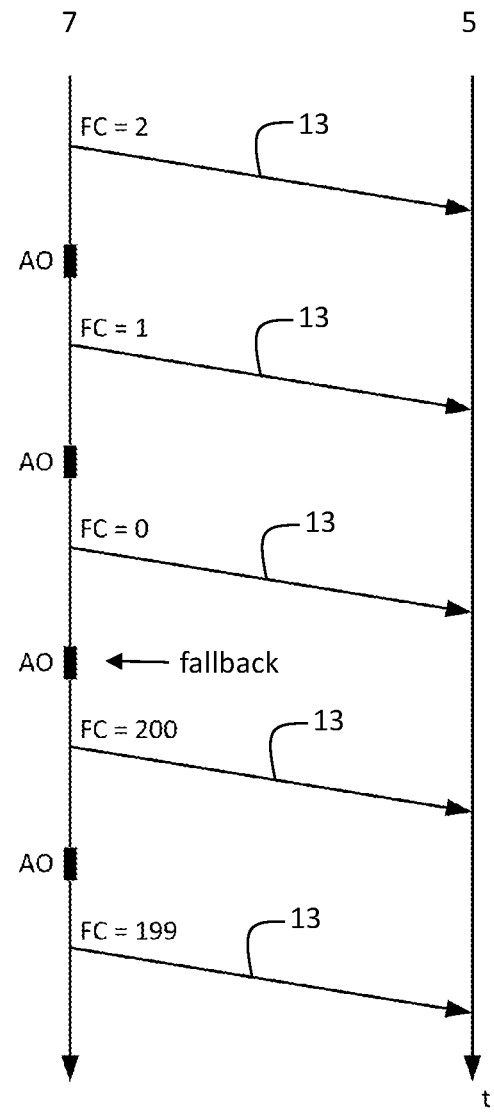
Fig. 2a                    Fig. 2b

METHOD FOR WIRELESS COMMUNICATION IN METER READING SYSTEMS

CROSS REFERENCE TO RELATED APPLICATIONS

This application claims the benefit of priority under 35 U.S.C. § 119 of European Application 20217053.6, filed Dec. 23, 2020, the entire contents of which are incorporated herein by reference.

TECHNICAL FIELD

The present disclosure relates to a method for wireless communication in meter reading systems, in particular for link management.

BACKGROUND

It is known that utility providers of electricity, water, gas and/or thermal energy use automatic meter reading (AMR) systems or advanced meter infrastructure (AMI) systems to efficiently and reliably manage customer billing. Such systems may be referred to as "dedicated" meter reading systems. Dedicated meter reading systems are characterised in that consumption meters are installed in a plurality of households, for instance, and communicate consumption data to a head-end-system (HES) via a wireless communication with dedicated data collection units. A single data collection unit may collect the consumption data read by thousands of consumption meters. Several data collection units may be distributed over a city or region to cover all consumption meters located therein. The consumption meters communicate with the data collection units wirelessly using license-free frequency bands in a manner that saves as much battery-power of the consumption meters as possible, because there is usually, in case of measuring water, gas and/or thermal energy consumption, no opportunity for recharging or exchanging the consumption meter battery. Consumption meters for registering a consumption of electric power, however, do not need to be battery-powered as they are connected to the mains electricity, i.e. utility power.

As dedicated meter reading systems use a dedicated Low Power Wide Area Network (LPWAN) in one or more specific frequency bands, preferably license-free ISM radio bands, this use may be limited in terms of transmission power, bandwidth and duty cycle by authoritative regulations. As an alternative to dedicated meter reading systems, a generic meter reading system may use a public cellular communications network instead of dedicated data collection units to collect the consumption data. For instance, the consumption meters may comprise a communication module, e.g. a modem, to connect to a LPWAN provided by a public cellular communications network, e.g. a Narrowband Internet-of-Things (NB-IoT) network or a Long-Term Evolution Machine Type Communication (LTE-M) network. The frequency bands used in such a LPWAN have less duty cycle limitations, but they are subject to a license fee. Furthermore, in contrast to dedicated meter reading systems that "own" (includes lease) the data collection unit infrastructure, a public cellular communications network is part of a generic communication infrastructure, in which the wireless communication infrastructure between the consumption meter and the HES is owned, maintained and controlled by external parties, e.g. mobile network operators (MNO). Using a dedicated meter reading system, a utility provider (UP) of electricity, water, gas and/or thermal energy only owns (or leases), maintains and controls all parts of the meter reading system.

The present disclosure relates in particular to a method for link management for wireless communication in dedicated meter reading systems including the data collecting infrastructure, i.e. the hardware and software for the data collection network.

As mentioned above, it is a technical challenge for such dedicated meter reading systems to communicate as energy-efficiently as possible in order to be able to conduct regular meter readings, e.g. every 30 minutes or hourly, over a period of 10, 15 or even 20 years without recharging or exchanging the battery in the battery-powered consumption meters. Furthermore, the risk of interference and congestion in the used frequency bands is to be reduced. Another challenge for communicating with any kind of consumption meter, including non-battery powered consumption meters such as electricity consumption meters, is to stay within the power and duty cycle limitations of the license-free ISM (industrial, scientific, medical) radio bands set by authoritative regulations.

Depending on the national or regional authoritative regulations, the duty cycle in license-free ISM radio frequency (RF) bands may be limited strictly to a maximum of 10% or less, wherein duty cycle is a percentage of time a sender is transmitting in the RF band. The duty cycle limitation is particularly relevant for the downlink transmission, i.e. the communication from the data collection unit to the consumption meters. The communication from the consumption meters to the data collection unit may be referred to as uplink transmission.

The downlink communication fulfils different tasks. For instance, the UP may use the HES for end-to-end communication with the consumption meter via the data collection unit, e.g. sending configuration commands, valve settings, updates, immediate reading request or other information queries. In addition to end-to-end communication, maintenance tasks are performed by the data collection unit, such as adjusting the real time clock of the measuring device or performing link management. Link management may include setting parameters of the radio frequency (RF) transmission of the consumption meter to communicate with a given RF link quality. Link management parameters that can be transmitted may be, for example, power level, level of forward error correction, modulation, RF transmission bandwidth, or RF channel selection. The link management performed by the data collection unit may be dependent on several aspects. For instance, a consumption meter located at a large distance to the data collection unit may be given a larger link budget, e.g. transmission power and/or uplink duty cycle, than a consumption meter located closer to the data collection unit. A larger link budget may enable overcoming a larger uplink path loss in the uplink communication between the consumption meter and the data collection unit. Providing a larger link budget comes with a higher energy consumption by the measuring device, a larger risk of RF collision due to potentially longer transmission duration. For those reasons, there is a general interest to keep the attributed link budget as low as possible.

It is therefore an object of the present disclosure to provide improved methods and products for wireless communication in this respect, in particular for link management within the regulative duty cycle limitations. This object may not be limited to meter reading systems with consumption meters, but may be applicable to any kind of stationary measuring devices for measuring or detecting a value at a utility installation. For example, this may include consumption meters, alarm sensors, acoustic noise detectors, chemical sensors, turbidity sensors, remotely controlled valves or other kinds of monitoring sensors.

SUMMARY

According to a first aspect of the present disclosure, a method is provided for link management for wireless communication between
- a plurality of measuring devices, wherein each of the measuring devices is installed to measure or detect a value at a respective utility installation, and
- at least one data collection unit for collecting data from the plurality of measuring devices, wherein the method comprises:
- sending uplink data frames from at least one of the measuring devices to the data collection unit,
- providing by at least some of the uplink data frames a time-limited access opportunity for receiving downlink frames from the at least one data collection unit,
- updating a counter value in the at least one of the measuring devices by adjusting the counter value for each non-used or unsuccessfully used access opportunity,
- transmitting an urgency indicator to the at least one data collection unit in at least some of those uplink data frames that provide an access opportunity, wherein the urgency indicator depends on the counter value,
- sending downlink frames to the at least one of the measuring devices according to a prioritization scheme being based on the urgency indicator.

Preferably, the measuring devices function as measuring devices being wirelessly connected to a data collection unit in a star topology, i.e. many measuring devices are connected to the same data collection unit. The measuring devices may be consumption meters, alarm sensors, acoustic noise detectors, chemical sensors, turbidity sensors, remotely controlled valves and/or other kinds of monitoring sensors. The communication between measuring devices and data collection units is here a bidirectional wireless radio communication. In the current solution, the communication preferably uses license-free ISM bands, e.g. around 868 MHz. In these bands, the communication is restricted by authoritative regulations in terms of maximum transmission duty cycle, wherein duty cycle is a percentage of time a sender is transmitting in the RF band. Especially a limited downlink duty cycle is a limiting factor of the data collection unit when it needs to communicate with many measuring devices. Depending on the national or regional authoritative regulations, the downlink duty cycle may be limited to a maximum of 10% or less. As the downlink duty cycle is limited, the data collection unit can end up in a situation where it needs to focus and prioritize which actions to which measuring devices should be served before other measuring devices. This is where the method described herein improves the link management for wireless communication.

Any communication herein is preferably initiated by the measuring device. The measuring device transmits an uplink frame to the data collection unit and opens its receiver for reception of a downlink frame from the data collection unit at a defined point in time relative to the uplink frame transmitted by the measuring device. This approach may be referred to as "listen-after-talk" (LAT). The timing of the time-limited access opportunity, i.e. "listening window", may be indicated in the uplink frame transmitted by the measuring device. The listening window may also be referred to as an access opportunity (AO). The measuring device does not necessarily provide an AO after every uplink frame. The interval between AOs may be determined based on a compromise between what latency in the bidirectional communication is acceptable and what energy consumption in the measuring device is acceptable. A large interval between AOs will result in a large latency, but it requires less energy consumption in the measuring device, because the radio receiver of the measuring device is less active. A shorter interval between AOs reduce latency, but increase the energy consumption in the measuring device.

The method described herein focusses on those uplink data frames that provide an AO. Please note that providing an AO does not imply that the measuring device necessarily "needs" a downlink data frame in response or specifically "requests" a response. It simply opens up the possibility for the data collection unit to access the measuring device if need be. The need is preferably determined by the data collection unit or the HES controlling the data collection unit. For instance, the HES may want to send, via the data collection unit, configuration commands, maintenance tasks, valve settings, updates, immediate reading request or other information to the measuring device. Maintenance tasks may be, for example, adjusting the real time clock of the measuring device or performing link management. Link management may include setting parameters of the RF transmission of the measuring device to communicate with a given RF link quality. Link management parameters that can be transmitted may be, for example, power level, level of forward error correction, modulation, RF transmission bandwidth, or RF channel selection.

In essence, the data collection unit is free to decide whether to use an AO for a downlink data frame or not. Thus, many of the AOs may be unused. Link management is executed by the data collection unit by using an AO to transmit a downlink command to the measuring device instructing it to communicate from now on using specific parameters. Once a measuring device has been link managed by a data collection unit, it continues its subsequent uplink operation using the parameters received by the data collection unit until another regulating mechanism overrules the received parameters.

The link management performed by the data collection unit may be dependent on several aspects. For instance, a measuring device located at a large distance to the data collection unit may be given a larger link budget, e.g. transmission power and/or uplink duty cycle, than a measuring device located closer to the data collection unit. A larger link budget may enable overcoming a larger uplink path loss in the uplink communication between measuring device and the data collection unit. Providing a larger link budget comes with a higher energy consumption by the measuring device, a larger risk of RF collision due to potentially longer transmission duration. For those reasons, there is a general interest to keep the attributed link budget as low as possible.

However, the data collection unit may in some situations misjudge the required RF link budget and request the measuring device to switch to a too low RF link budget causing the measuring device to transmit uplink frames which cannot be received by the data collection unit. In other scenarios, the surroundings may change due to, for example, changing weather conditions leading to uplink frames not reaching the data collection unit. Since the LAT communication is initiated by the measuring device, the measuring device is not accessible if its uplink data frames do not reach the data collection unit.

The data in the uplink data frame may comprises a certain redundancy to account for lost uplink data frames in order to provide a "gap-less" reading. For instance, an uplink data frame may comprise consumption data of the latest 10 scheduled readings, i.e. which would be a 90% data overlap or redundancy. This may account for sporadic and short fluctuations leading to individual data losses.

However, if the communication settings are permanently sub-optimal, many or all of the uplink data frames do not reach the data collection unit, which means that the measuring device is hardly or not accessible. In order to prevent this, a fallback scheme may be included in each measuring device that triggers the measuring device to increase its link budget on its own initiative if no downlink data frame is received from the data collection unit for a certain period of time. In case of a fallback, the link budget may be increased in both for the uplink and downlink directions.

The fallback scheme is a type of "emergency brake" that should only be activated in case the uplink frames of the measuring device really do not reach the data collection unit, because a fallback significantly increases the energy consumption. To prevent the measuring device from executing the fallback scheme during normal conditions, the link setting may be confirmed by the data collection unit at regular intervals. This interval may be individual to the measuring device and may be unknown to the data collection unit.

The data collection unit is not able to transmit a downlink response to all AOs of all measuring devices, because that would lead to congestion in downlink channels. The data collection unit therefore schedules and queues downlink responses. The result of this is either that measuring devices may execute the fallback scheme undesirably or that the data collection unit spends too much downlink duty cycle to confirm the link settings of measuring devices more often than necessary. The first situation has the consequence that the data collection unit is left with even more downlink actions to take care of as it now needs not only to confirm current settings of measuring devices, but also to revert the undesired fallback action. The latter situation leaves less downlink duty cycle of the data collection unit to be used for other tasks such as for example tasks initiated by the HES.

The solution to reduce the risk of undesirable fallback actions according the method described herein is that
  a counter value is updated within the measuring device by adjusting the counter value for each non-used or unsuccessfully used AO,
  an urgency indicator is transmitted in at least some those uplink data frames that provide an AO, wherein the urgency indicator depends on the counter value, and
  the data collection unit responds with a downlink frame according to a prioritization scheme being based on the urgency indicator.

For instance, the counter value may be a countdown value that is decremented with each AO provided by the measuring device in which no response in form of a downlink data frame is received from the data collection unit. Alternatively, the counter value may be incremented with each non-used or unsuccessfully used AO. It should be noted that the data collection unit may decide not use an AO for sending downlink frame, which results in a non-used AO. The counter value may, however, also count used AOs for which the downlink frame transmission has failed for some reason which would result in an unsuccessfully used AO. So, the counter value may count every AO the measuring device provided and during which a downlink frame is not or not successfully received by the measuring device.

Optionally, the urgency indicator is the counter value itself. Thereby, the data collection unit may interpret the counter value and decide on an urgency for a downlink response based on the received counter value, e.g. setting an urgency threshold. Alternatively, the measuring device may determine the urgency based on the counter value. In this case, the urgency indicator may be a flag, a Boolean information or another kind of urgency value. In any case, the urgency indicator is preferably only sent if the counter value has reached a certain urgency threshold. If an uplink data frame does not contain an urgency indicator, it may be interpreted as low urgency by the data collection unit.

The urgency indicator may be transmitted in only some of those uplink data frames that provide an AO or in some of all uplink data frames. The data collection unit uses the urgency indicator as an urgency level to prioritise its downlink action accordingly. The data collection unit can also use this information to reduce its downlink activity to measuring device in general.

Optionally, the method may further comprise adjusting transmission parameters by the at least one of the measuring devices if the counter value reaches a counter threshold. A fallback may be a specific form of adjusting transmission parameters by the measuring device on its own initiative in this respect. So, a fallback may be self-initiated by the measuring device if the counter value has reached the counter threshold. In case of a countdown value, the counter threshold may be zero. Thus, the counter value gives an indication about when the measuring device will trigger a fallback. If the counter value is far away from the counter threshold, i.e. the counter value has not reached an urgency threshold, the data collection unit may save downlink budget by not using the associated AO for a response, i.e. the AO has a low urgency and thus priority. For instance, the data collection unit may have experienced that it usually needs to transmit up to 10 frames in the worst case to eventually reach the measuring device. It may therefore set the urgency threshold to 10. It can then skip the downlink activity to measuring devices as long as the counter value is more than 10 away from the threshold, i.e. the urgency indicator indicates that the counter value has not reached the urgency threshold or no urgency indicator is received at all. If the urgency indicator indicates, however, that the counter value is close to the counter threshold, e.g. at or closer than urgency threshold of 10, the data collection unit may want to make sure that the measuring device receives a downlink data frame before it triggers a fallback, i.e. the AOs now have a high urgency and thus high priority, so that they are used for a downlink response.

Optionally, the method may further comprise increasing an uplink budget by the at least one of the measuring devices to a first uplink budget level if the counter value reaches a first counter threshold and to a second uplink budget level if the counter value reaches a second counter threshold. So, there may be may one or more fallback stages, so that the uplink budget is increased in at least two steps depending on the counter value, i.e. a "soft fallback" and "hard fallback". The soft fallback is the first stage fallback that increases the link budget to a first level. After a soft fallback, the hard fallback may follow at the second counter threshold for increasing the link budget even more. The urgency indicator may indicate whether the next fallback is a soft fallback or a hard fallback, so that the data collection unit may prioritise its response accordingly. After a soft fallback and before a hard fallback, the measuring device may increase the frequency of offered AOs to provide higher accessibility before the hard fallback is triggered. The consequences in terms of increased energy consumption or congestion are less severe in case of a soft fallback compared to a hard fallback.

Optionally, the prioritisation scheme may also be based on the current uplink budget used by the at least one of the measuring devices. For instance, an AO of a measuring device with a higher uplink budget, e.g. due to a soft or hard fallback, may have a higher priority to be used than an AO of a measuring device with a lower uplink budget. The saving potential in terms of energy consumption may be the highest for those measuring devices with the highest uplink budget. Especially an AO of a measuring device with a high uplink budget after a hard fallback, it may have high priority for the data collection unit to quickly perform link management and reduce the uplink budget to a minimum level needed.

Optionally, the counter value may be reset to a start value by the at least one of the measuring devices if the at least one of the measuring devices receives at least one of the downlink frames. In case of a countdown value, the start value may be 200, for instance. In case of counting upward the start value may be 0, for instance. Whenever the measuring device receives a downlink data frame, it is preferably link managed by it, so that the counter value is reset to its initial start value. This means that the counter value counts the number of consecutively non-used or unsuccessfully used AOs. Once a single AO is successfully used, the counter is reset.

Optionally, the method may further comprise setting a maximum counting distance for the at least one of the measuring devices by sending a downlink frame from the at least one data collection unit to the at least one of the measuring devices. In case of a countdown value, the maximum counting distance may be equivalent to the start value. This feature is particularly advantageous when the data collection unit is temporarily in a situation in which it has a high downlink communication load or backlog. This may be the case in a start-up scenario after a power glitch, for instance. In such a situation, many measuring devices might need to be link managed as soon as possible. In such a situation, the measuring devices should be more patient in their fallback evaluation until the downlink communication load or backlog has reduced to a normal level. In this situation, it is advisable to temporarily increase the maximum counting distance, e.g. to 400. If the measuring device is typically counting down during one week, which may correspond to a counting distance of 200, the data collection unit may in this case temporarily set the maximum counting distance to 400. This would then prevent the measuring device from executing the fallback scheme for at least two weeks. If the data collection unit regrets the decision, it can set the maximum counting distance back to a default value by using a later AO. The setting of a maximum counting distance may be applied for one or more individual measuring devices, certain groups or subsets of measuring devices, or for all measuring devices.

A low maximum counting distance causes the measuring device to execute the fallback scheme shortly after the latest downlink data frame from the data collection unit. This is advantageous in communication scenarios in which the RF conditions are changing rapidly. If a measuring device is lost, the fallback scheme is quickly executed to reach the data collection unit. This has, however, the drawback that the data collection unit needs to confirm the link settings in the measuring device relatively often to prevent the measuring device from executing the fallback scheme under normal conditions. This may still be useful either in areas with few measuring devices or in case the connectivity for some measuring devices or types of measuring devices is more important than for others, e.g. for industrial meters, alarm sensors, or remotely controlled valves. For instance, a remotely controlled water supply valve may need a quick access to close the valve in case of leakage and open the valve to reconnect a consumer.

A high maximum counting distance delays the fallback scheme for a relatively long time after the latest response from the data collection unit. This saves downlink duty cycle budget that can be used for other purposes by the data collection unit, because the link settings of the measuring device need to be less frequently confirmed, e.g. only every month instead of every week. This may be useful in a case of relatively stable RF conditions without rapid changes. Such high maximum counting distances may be less suitable for critical measuring devices, e.g. industrial meters or alarm sensors, but well suitable for less critical applications, e.g. domestic consumption meters.

By enabling the data collection unit to manage the maximum counting distance of the measuring devices, either temporarily or permanently, the data collection unit is able to control the behaviour of the measuring devices in the network and reduce the risk of unnecessary fallback actions. The data collection unit is able to take a broader picture into account when setting the maximum counting distance than what is possible within the realm of the measuring device. In contrast to a fixed maximum counting distance predetermined by the manufacturer, an adaptable maximum counting distance has the advantage that it can be dynamically adapted to the prevailing conditions and applications.

Further in connection with the first aspect of the present disclosure, a measuring device is provided for measuring or detecting a value at a utility installation, wherein the measuring device is configured to wirelessly send uplink data frames to at least one data collection unit and to provide, after each sending of at least some of the uplink data frames, a time-limited access opportunity for receiving downlink frames from the at least one data collection unit, wherein the measuring device is configured to update a counter value by adjusting the counter value for each non-used or unsuccessfully used access opportunity and to transmit an urgency indicator to the at least one data collection unit by at least some of those uplink data frames that provide an access opportunity, wherein the urgency indicator depends on the counter value.

Optionally, the measuring device may be configured to adjust transmission parameters if the counter value reaches a counter threshold.

Optionally, the measuring devices may be a consumption meter, an alarm sensor, an acoustic noise detector, a chemical sensor, a turbidity sensor, a remotely controlled valve and/or another kind of monitoring sensor.

Optionally, the measuring device may be configured to increase an uplink budget to a first uplink budget level if the counter value reaches a first counter threshold and to increase the uplink budget to a second uplink budget level if the counter value reaches a second counter threshold.

Optionally, the measuring device may be configured to reset the counter value to a start value if the measuring device receives at least one of the downlink frames.

Optionally, the urgency indicator may be the counter value itself. Thereby, the data collection unit may interpret the counter value and decide on an urgency for a downlink response based on the received counter value, e.g. setting an urgency threshold. Alternatively, the measuring device may be configured to determine the urgency based on the counter value. In this case, the urgency indicator may be a flag, a Boolean information or another kind of urgency value. The measuring device may be configured to send the urgency indicator only if the counter value has reached a certain urgency threshold. If an uplink data frame does not contain an urgency indicator, it may be interpreted as low urgency by the data collection unit.

Further in connection with the first aspect of the present disclosure, a data collection unit is provided for wirelessly collecting data from a plurality of measuring devices, wherein each of the measuring devices is configured to measure or detect a value at a respective utility installation, wherein the data collection unit is configured to receive uplink data frames from at least one of the measuring devices, wherein at least some of the uplink data frames each indicate a time-limited access opportunity provided by at least one of the measuring devices for receiving a downlink frame from the data collection unit, wherein the data collection unit is configured to send downlink frames to the at least one of the measuring devices according to a prioritization scheme being based on an urgency indicator provided in at least some of the uplink data frames, wherein the urgency indicator is based on a counter value being indicative of a number of non-used or unsuccessfully used access opportunities for a respective measuring device.

Optionally, the data collection unit may be configured to set a counter rest value at the at least one of the measuring devices by sending at least one of the downlink frames to the at least one of the measuring devices.

In the following, a second aspect of the present disclosure is described, wherein the second aspect provides an independent solution from the first aspect described above. The second aspect, however, or features thereof, may be combined with the first aspect, or features thereof, to achieve synergetic effects for improving the link management for wireless communication in dedicated meter reading systems. The second aspect may, however, in particular be applied as an alternative to the first aspect described above.

In connection with the second aspect of the present disclosure, a method is provided for link management for wireless communication between a measuring device, wherein the measuring device is installed to measure or detect a value at a utility installation, and a data collection unit for collecting data from the measuring device, wherein the method comprises:

sending data in a primary uplink data frame from the measuring device to the data collection unit via a primary channel, providing by the measuring device, after sending the primary uplink data frame, a time-limited primary access opportunity for receiving a link management downlink frame from the data collection unit, evaluating a primary signal quality upon receiving the primary uplink data frame via the primary channel, sending one or more secondary uplink frames from the measuring device to the data collection unit via one or more secondary channels, providing by the measuring device, after sending of at least some of the secondary uplink data frames, a time-limited secondary access opportunity for receiving a link management downlink frame from the data collection unit, evaluating one or more secondary signal qualities upon receiving the one or more secondary frames via the one or more secondary channels, selecting one among the primary access opportunity and the one or more secondary access opportunities for sending a link management downlink frame from the data collection unit to the measuring device depending on the evaluation of the primary signal quality and the one or more secondary signal qualities, and using, after receiving said link management downlink frame during the selected access opportunity from the data collection unit, the associated channel as the primary channel for sending data in a primary uplink data frame from the measuring device to the data collection unit.

A long connectivity range for the wireless communication can generally not be obtained by simply increasing transmission power due to authoritative regulations on license-free ISM radio bands. The longer range is obtained, for example, by using forward error correction (FEC) methods and/or either narrow band transmissions or the spreading of the signal in time and/or frequency. In any case, the longer connectivity range comes at the cost of a decreased information rate. In other words, the spectrum efficiency is decreased. The measuring devices may be consumption meters, alarm sensors, acoustic noise detectors, chemical sensors, turbidity sensors, remotely controlled valves and/or other kinds of monitoring sensors.

A wireless communication technology over long ranges, e.g. low power wide area network (LPWAN), between a measuring device and a data collection unit enables a wide area coverage and thereby large LPWAN cells, in which a single data collection unit can obtain readings from thousands of measuring devices. However, only the measuring devices situated in the most remote positions within a LPWAN cell require maximum connectivity range to be paid by a decreased spectrum efficiency. If all measuring devices were using the maximum range mode (lowest spectrum efficiency), undesirable congestion would be introduced to the communication network. Excessive collisions between data frames within the communication network as well as interference with other ISM band users would be introduced, while the power-consumption in the measuring devices would be unnecessarily high.

A solution to this problem is that the measuring devices support multiple communication modes and channels with different levels of decreased spectrum efficiency. Thereby, the measuring device is able to use only the required spectrum and energy to reach the data collection unit. These different communication modes can be realised across different communication channels, which may have different center frequencies and/or bandwidths. The process of how the measuring devices are being commanded to select or select themselves the most suitable mode or channel is part of the link management.

Any communication herein is preferably initiated by the measuring device. The measuring device transmits an uplink frame to the data collection unit and opens its receiver for reception of a downlink frame from the data collection unit at a defined point in time relative to the uplink frame transmitted by the measuring device. This approach may be referred to as "listen-after-talk" (LAT). The timing of the time-limited access opportunity, i.e. "listening window", may be indicated in the uplink frame transmitted by the measuring device. The listening window may also be referred to as an access opportunity (AO). The measuring device does not necessarily provide an AO after every uplink frame. The majority of AOs may not be used by the data collection unit for a downlink frame.

So, the data collection unit may use AOs to send link management downlink frames to the measuring devices to actively perform link management, i.e. commanding the measuring devices which communication mode and channel to use for uplink data frames.

In principle, one approach to link management could be to define mapped uplink and downlink modes from which a suitable pair is chosen at installation of the measuring device. This means that a setup of uplink modes and an equivalent set of equivalent downlink modes may be associated with each other and each pair provides symmetric link budget for uplink and downlink communication.

There are certain issues with such an approach. Firstly, the symmetry between uplink and downlink modes may depend on hardware configurations in the measuring device and in the data collection unit. In particular, an antenna configuration on the data collection unit has a large impact on the mode symmetry. As data collection unit affiliation may change for a given measuring device over its lifetime, the symmetry is not necessarily constant over time, because the data collection unit's hardware configurations may vary. Another issue comes with the frequency bands that are in use, because uplink and downlink channel(s) are often not in the same ISM band due to differences between regulation rules for different bands. Therefore, signal quality symmetry between the up- and downlink is location specific and depends on the amount of interference in the relevant frequency bands locally available. The signal quality symmetry may be even time-dependent, because the frequency band usage changes over time.

As there are temporal changes in the channel(s), a link may degrade over time such that either the uplink data frames cannot be received at the data collection unit(s), or the link management downlink data frames from the data collection unit cannot be received by the measuring device. To be able to handle such a scenario, a fallback scheme as described above in connection with the first aspect may be applied, wherein certain rules are applied to "fall back" to a previous or default setting if no link management downlink data frames are received by the measuring device for a certain time.

In addition, the link management may include multiple channels of which not necessarily the same channels are used. This may be the case for both for up- and downlink. Therefore, changing channel may often require
- a very rigid set of channels that is known to all network elements at system roll-out and then cannot change, or
- a significant amount of communication between the measuring device and the data collection unit to exchange the necessary information about supported channels, which will be required for each measuring device yielding a significant downlink duty cycle load and power consumption.

The second aspect described herein is directed to allowing optimal link management in both up- and downlink over time, while minimising the amount of data required to be transferred. The second aspect described herein is especially advantageous for systems in which the measuring devices have multiple channel frequencies and/or channel modes to choose from.

The idea is here as follows. Firstly, a primary signal quality is evaluated by the data collection unit upon receiving a primary uplink data frame via a primary channel. The primary channel may be currently selected channel for communicating data to the data collection unit. Before, in parallel or after sending the primary uplink data frame, the measuring device sends one or more secondary uplink frames to the data collection unit via one or more secondary channels. The secondary uplink frames may be test frames of any kind with little or no data. However, at least some of the secondary uplink data frames provide an AO for the data collection unit to use for link management downlink frames. The data collection unit evaluates also the signal qualities of the secondary uplink data frames, i.e. one or more secondary signal qualities. Depending on the primary signal quality and the one or more secondary signal qualities, the data collection unit selects the AO for sending a link management downlink frame: either the AO provided by the primary uplink data frame or an AO provided by one of the secondary uplink data frames. Preferably, it chooses the AO provided by the uplink data frame with the most adequate signal quality. It should be noted that the most adequate signal quality may not be the highest signal quality. In fact, a too high signal quality comes at the cost of link budget, so that the most adequate signal quality in light of the link budget is preferably selected. For instance, it may be beneficial to select the AO provided by the uplink data frame achieving the same or a lower signal quality with less link budget. So, it is preferred that the data collection unit selects the AO provided by the uplink data frame with the lowest signal quality above a pre-determined quality threshold among the primary signal quality and the one or more secondary signal qualities. If the AO of one of the of the secondary uplink data frames is selected, the measuring device receives the link management downlink frames in the selected AO and switches automatically to the corresponding secondary channel as the new primary channel for sending data to the data collection unit.

A further advantage of the above solution is that the new primary channel is automatically tested in the downlink direction. So, if the available link budget were asymmetric to a such a degree that the link management downlink frames are not received by the measuring device, the selection of the new primary channel would be inefficient. The above solution excludes this, because the measuring device does not switch to the new primary channel unless it receives a link management downlink frame during the respective AO.

So, the data collection unit simply chooses a certain AO for the response and no data exchange for agreeing on a new communication mode or channel is needed. It should be noted that there is no need for the data collection unit to read or understand any of the data in the primary or secondary uplink data frames. In fact, the primary uplink data frames may contain end-to-end encrypted data addressed to the HES and the secondary uplink data frames may contain little to none data.

Optionally, the AO provided by the uplink data frame with the most adequate signal quality among the primary signal quality and the one or more secondary signal qualities may be selected. It should be noted that the most adequate signal quality may not always be the highest signal quality. A too high signal quality comes at the cost of link budget, so that the most adequate signal quality in light of the link budget is preferably selected. For instance, it may be beneficial to select the AO provided by the uplink data frame achieving the same or a lower signal quality with less link budget. So, it is preferred that the data collection unit selects the AO provided by the uplink data frame with the lowest signal quality above a pre-determined quality threshold among the primary signal quality and the one or more secondary signal qualities. Sending of the link management downlink frame may be delayed or queued until one or more secondary signal qualities are evaluated. In terms of queuing the link management downlink frame, the second aspect can be combined with a synergetic effect with the first aspect described above. The prioritisation scheme to decide which measuring device to serve with link management may also be based on whether there is a more adequate secondary signal quality available. Vice versa, the counter value may indicate that there is enough time to queue the link management downlink frame longer for evaluating more secondary signal qualities.

Optionally, the method may further comprise sending data in a primary uplink data frame from the measuring device to the data collection unit via one of the secondary channels after the measuring device has received the link management downlink frame in the respective access opportunity. This means that the secondary channel is actually used as the new primary channel for sending data.

Optionally, the one or more secondary uplink frames may be shorter than the primary uplink data frame. As sending the secondary uplink frames as test frames is an uplink budget investment to see if there is a better mode or channel to use, it should be as small as possible to allow a signal quality evaluation at the data collection unit. In contrast to that, the primary uplink data frame contains the data to be delivered to the HES. However, the one or more secondary uplink frames may contain at least partly redundant information in view of the primary uplink data frame.

Optionally, the sending of the one or more secondary uplink frames may be less frequently than the sending of the primary uplink data frame. Again, as sending the secondary uplink frames as test frames is an uplink budget investment to see if there is a better mode or channel to use, it can be reduced in frequency, e.g. only every $10^{th}$ primary uplink data frame may be accompanied by one or more secondary uplink frames.

Optionally, the primary signal quality and/or the one or more secondary signal qualities may be determined on the basis of a signal-to-noise ratio (SNR) and/or signal-to-interference-plus-noise ratio (SINR).

Optionally, the primary channel and/or the one or more secondary channels may differ among each other by any one of a group comprising:
  center frequency of the frequency band,
  symbol rate,
  bandwidth,
  modulation type, and
  modulation parameters.

Optionally, the primary channel and/or the one or more secondary channels may differ among each other by the modulation type of any one of a group comprising:
  binary phase key shifting (BPSK),
  Gaussian frequency shift keying (GFSK),
  Gaussian minimum shift keying (GMSK), and
  chirp modulation or variants thereof.

Optionally, the primary channel and/or the one or more secondary channels may differ among each other by any one of a group comprising:
  using direct sequence spread spectrum (DSSS),
  using chirp spread spectrum (CSS), and
  using frequency hopping spread spectrum (FHSS).

Further in connection with the second aspect of the present disclosure, a data collection unit is provided for wirelessly collecting data from a plurality of measuring devices, wherein each of the measuring devices is installed to measure or detect a value at a respective utility installation, wherein the data collection unit is configured to receive data in a primary uplink data frame from at least one of the measuring devices via a primary channel, wherein the primary uplink data frame indicates a time-limited primary access opportunity provided by said at least one of the measuring devices for receiving a link management downlink frame from the data collection unit, wherein the data collection unit is further configured to evaluate a primary signal quality upon receiving the primary uplink data frame via the primary channel, wherein the data collection unit is further configured to receive one or more secondary uplink frames from the at least one of the measuring devices via one or more secondary channels, wherein at least some of the secondary uplink frames indicate a time-limited secondary access opportunity provided by said at least one of the measuring devices for receiving a link management downlink frame from the data collection unit, wherein the data collection unit is further configured to evaluate the one or more secondary signal qualities upon receiving the one or more secondary frames via the one or more secondary channels, wherein the data collection unit is further configured to select one among the primary access opportunity and the one or more secondary access opportunities for sending a link management downlink frame to the at least one of the measuring devices depending on the evaluation of the primary signal quality and the one or more secondary signal qualities, so that the associated channel is then used as the primary channel for receiving data in a primary uplink data frame from the at least one of the measuring devices.

Optionally, the data collection unit may be further configured to select the AO provided by the uplink data frame with the most adequate signal quality among the primary signal quality and the one or more secondary signal qualities. It should be noted that the most adequate signal quality may not be the highest signal quality. A too high signal quality comes at the cost of link budget, so that the most adequate signal quality in light of the link budget is preferably selected. For instance, it may be beneficial to select the AO provided by the uplink data frame achieving the same or a lower signal quality with less link budget. So, it is preferred that the data collection unit selects the AO provided by the uplink data frame with the lowest signal quality above a pre-determined quality threshold among the primary signal quality and the one or more secondary signal qualities.

Optionally, the data collection unit may be configured to receive data in a primary uplink data frame from the at least one of the measuring devices via one of the secondary channels after the data collection unit has sent the link management downlink frame to the at least one of the measuring devices in the associated access opportunity.

Optionally, the data collection unit may be configured to determine the primary signal quality and/or the one or more secondary signal qualities on the basis of a signal-to-noise ratio (SNR) and/or signal-to-interference-plus-noise ratio (SINR).

Optionally, the primary channel and/or the one or more secondary channels may differ among each other by any one of a group comprising:
  center frequency of the frequency band,
  symbol rate,
  bandwidth, modulation type, and modulation parameters.

Optionally, the primary channel and/or the one or more secondary channels may differ among each other by the modulation type of any one of a group comprising:

binary phase key shifting (BPSK),

Gaussian frequency shift keying (GFSK),

Gaussian minimum shift keying (GMSK), and chirp modulation or variants thereof.

Optionally, the primary channel and/or the one or more secondary channels may differ among each other by any one of a group comprising:

using direct sequence spread spectrum (DSSS), using chirp spread spectrum (CSS), and using frequency hopping spread spectrum (FHSS).

In the following, a third aspect of the present disclosure is described, wherein the third aspect provides an independent solution from the first and second aspect described above. The third aspect, however, or features thereof, may be combined with the first and/or second aspect, or features thereof, to achieve synergetic effects for improving the wireless communication in dedicated meter reading systems.

In connection with the third aspect of the present disclosure, a wireless communication method is provided between a plurality of measuring devices, wherein each of the measuring devices is installed to measure or detect a value at a respective utility installation, and at least one data collection unit for collecting data from the plurality of measuring devices, wherein the method comprises:

sending uplink data frames from at least one of the measuring devices to the data collection unit, providing by the at least one of the measuring devices, after sending of at least some of the uplink data frames, a time-limited access opportunity for receiving a downlink frame from the at least one data collection unit, classifying downlink frames to be sent from the at least one data collection unit to the at least one of the measuring devices, sending a classified downlink frame to the at least one of the measuring devices during an access opportunity only if a current duty cycle does not exceed a duty cycle limit, wherein the duty cycle limit depends on a prioritization of the class of the downlink frame.

Also, in connection with the third aspect, any communication herein is preferably initiated by the measuring device. The measuring device transmits an uplink frame to the data collection unit and opens its receiver for reception of a downlink frame from the data collection unit at a defined point in time relative to the uplink frame transmitted by the measuring device. This approach may be referred to as "listen-after-talk" (LAT). The timing of the time-limited access opportunity, i.e. "listening window", may be indicated in the uplink frame transmitted by the measuring device. The listening window may also be referred to as access opportunity (AO). The measuring device does not necessarily provide an AO after every uplink frame. The measuring device may be a consumption meter, alarm sensor, acoustic noise detector, chemical sensor, turbidity sensor, remotely controlled valve and/or other kinds of monitoring sensor.

There are different kinds of downlink frames that the data collection unit needs to send to the measuring devices using an AO. As described before in connection with the first and second aspect of the present disclosure, the data collection unit is supposed to perform link management. The data collection unit decides which AO to use for sending a link management downlink frame to a measuring device. The data collection unit may perform link management for a plurality of measuring devices, so that link management downlink frames may be queued according to a prioritization scheme as described in connection with the first aspect.

However, the data collection unit is also supposed to transmit downlink frames that originate from the HES, i.e. in the context of end-to-end communication. For instance, the utility provider (UP) may want to read specific measuring devices or certain groups of measuring devices or control a specific remotely controlled valve. For this, the UP may use the HES to start an end-to-end communication with the measuring device via the data collection unit. The transmission of end-to-end frames to a certain measuring device can be initiated whenever an AO was provided by an uplink frame by said measuring device. End-to-end communication may comprise one or more request/response communication sequences. If an end-to-end downlink frame was already sent to a measuring device and there is more end-to-end communication planned with said measuring device, there is a queue of end-to-end downlink frames in the data collection unit, which may be referred to as ongoing downlink traffic (ongoing session). End-to-end frames that are not yet part of an ongoing session may be referred to as privileged downlink traffic.

A problem occurs if the data collection unit is currently busy with link management when it is supposed to transmit end-to-end downlink frames. Ongoing or privileged downlink traffic may be suspended if they were to exceed the maximum allowed downlink duty cycle. The outstanding end-to-end frames will remain buffered for a long time in the data collection unit until the current duty cycle allows it again and the next AO for it is given.

Addressed end-to-end communication may be encrypted and secured using a request/response protocol. So, a retransmission scheme may be applied in the measuring device if an acknowledgement is not received from the data collection unit in a certain AO. Retransmissions, however, should be avoided as much as possible, because they consume battery-power of the measuring device. Thus, ongoing sessions should be finished as soon as possible.

The following are examples of situations in which end-to-end downlink frames may be queued due to the maximum allowed downlink duty cycle:

There is a currently high amount of desired end-to-end data addressed to a specific group of measuring devices providing AOs and the amount of transmission time needed to use said AOs would lead to an excess of the maximum allowed downlink duty cycle.

A data collection unit has been out of service (e.g. after maintenance, breakdown, or power glitch), all allowed downlink duty cycle may be needed for link management for a longer period.

Consequently, in these situations, end-to-end traffic may be delayed up to several days, which is not acceptable for the UP who needs to access any measuring device quickly. The method according to the third aspect described herein allows high priority end-to-end downlink traffic even if the system is in a high load situation while keeping the measuring devices from triggering a fallback action, e.g. using their maximum uplink budget, and finishing ongoing downlink traffic swiftly. Furthermore, all allowed duty cycle may still be used when no privileged downlink traffic is pending.

The solution is here to classify the downlink frames to be sent from the data collection unit to the measuring device and to send a classified downlink frame to the measuring device in an AO only if a current duty cycle does not exceed a duty cycle limit, wherein the duty cycle limit depends on a prioritization of the class of the downlink frame. A coarse classification of downlink frames may be as follows:

| | |
|---|---|
| Critical downlink traffic | High priority link management downlink traffic, e.g. traffic that is necessary to prevent a measuring device from sending with maximum uplink budget (e.g. triggering fallback) |
| Maintenance downlink traffic | Low priority link management downlink traffic, e.g. traffic that optimizes the link between a measuring device and a data collection unit. |
| Privileged downlink traffic | End-to-end downlink traffic queued in the data collection unit that is addressed to a measuring device but not yet scheduled/transmitted to a measuring device. |
| Ongoing downlink traffic | Any traffic necessary to finish already started end-to-end downlink traffic until the final acknowledgement in a sequence is received from the measuring device |

It should be noted that the solution is not simply to allocate a certain bandwidth for the different classes of downlink traffic. That would not be an efficient use of the available downlink budget. Instead, different duty cycle limits are applied by the data collection unit depending on a prioritisation of the class of the downlink frames. It is important to understand that the downlink frames are not simply prioritised in the sense that a higher priority data frame is sent first and then a lower priority data frame is sent. The method disclosed herein handles downlink frames with different priority simultaneously as long as the current duty cycle allows for it. So, as long as the current duty cycle allows for it, downlink traffic with a low priority is transmitted even if higher priority downlink traffic is pending in the data collection unit. The duty cycle limits are dynamic and depend on whether or not there are higher priority downlink frames pending for transmission. Preferably, the duty cycle limit of the highest priority among the currently pending downlink frames is set to the maximum duty cycle while the distance to the lower duty cycle limits is maintained, i.e. each lower duty cycle limit is adapted according to the duty cycle limit above. This dynamic behaviour provides an efficient use of the available duty cycle.

Optionally, the method may further comprise determining the current duty cycle in a regular, sporadic or continuous manner. Each data collection unit may calculate continuously its current duty cycle.

Optionally, the current duty cycle may be determined each time the at least one data collection unit plans to transmit a downlink frame. For instance, the data collection unit may check for each planned downlink frame if its estimated transmission duration fits within the downlink budget.

Optionally, the method may further comprise classifying the downlink frame in N different classes, wherein a priority i and a duty cycle share $DC_i$ is associated to each class, wherein i∈{0, ..., N−1}, wherein the duty cycle limit to be applied for the $i^{th}$ class is a maximum duty cycle minus the sum of duty cycle shares $DC_j$ of any pending classes j with higher priority, wherein j∈{0, ..., i−1}. Preferably, the duty cycle limit is dynamically adapted when the number of pending classes j with higher priority changes.

The following definitions may be used to describe the algorithm:
Max D.C.: The maximum duty cycle allowed for the data collection unit to use, e.g. the duty cycle limitation set by authoritative regulations.
Current D.C. [0-Max D. C]: The current downlink duty cycle determined over a sliding time window (e.g. one hour).
Priority [P0 ... PK]: Priority of the downlink traffic, where K=N−2 is an integer value greater than or equal to 1
P0—Active frames: e.g. critical downlink traffic and ongoing downlink traffic
P1: Highest priority frames (e.g. of privileged downlink traffic)
PK: Lowest priority frames (e.g. of privileged downlink traffic)
Maintenance: Example: Maintenance downlink traffic
Duty cycle limits [L0 ... LK]: Exceeding a limit will restrict the downlink traffic to classified downlink traffic of according priority or higher, where K=N−2 is an integer value greater than or equal to 1
L0: Priority P0 limit
L1: Priority P1 limit
LK: Priority PK limit If no pending P1-PK downlink traffic exists for any measuring device in the data collection unit, the data collection unit may only be restricted by the maximum duty cycle set by authoritative regulations.

However, when privileged downlink traffic (P1-PK) is pending in the data collection unit, a priority selection algorithm favours higher priority downlink traffic over lower priority downlink traffic if the transmission of frames collides in time. Furthermore, a priority among the privileged downlink traffic may be set in the HES by the UP.

Optionally, the classified downlink frame may only be sent to the at least one of the measuring devices during an access opportunity if there is no other access opportunity provided by another uplink data frame of another measuring device that requires a classified downlink frame with a higher priority that would at least partly overlap in time. The priority scheme may thus be a used in addition to resolve conflicts.

Optionally, the method may further comprise
initiating an end-to-end communication by sending one or more end-to-end downlink frames from a head-end system (HES) to the at least one data collection unit,
receiving the end-to-end downlink frames by the at least one data collection unit,
classifying the end-to-end downlink frames, and
transmitting the classified end-to-end downlink frames to at least one of the measuring devices during an access opportunity only if the current duty cycle does not exceed a duty cycle limit, wherein the duty cycle limit depends on a prioritization of the class of the end-to-end downlink frames.

Optionally, the method may further comprise terminating the end-to-end communication by receiving an acknowledgement uplink data frame from said at least one of the measuring devices at the at least one data collection unit.

Optionally, end-to-end downlink frames of a non-terminated end-to-end communication may be classified as the highest priority downlink frames.

Optionally, end-to-end downlink frames may be classified to have a higher priority than maintenance downlink frames.

Further in connection with the third aspect of the present disclosure, a data collection unit is provided for wirelessly collecting data from a plurality of measuring devices, wherein each of the measuring devices is installed to measure or detect a value at a respective utility installation, wherein the data collection unit is configured to receive uplink data frames sent by at least one of the measuring devices, wherein at least some of the uplink data frames each indicate a time-limited access opportunity provided by the at least one of the measuring devices for receiving a downlink frame from the at least one data collection unit, wherein the data collection unit is further configured to send a classified downlink frame to the at least one of the measuring devices during an access opportunity only if a current duty cycle does not exceed a duty cycle limit, wherein the duty cycle limit depends on a prioritization of the class of the downlink frame.

Optionally, the data collection unit may be configured to regularly, sporadically or continuously determine or receive the current duty cycle.

Optionally, the data collection unit may be configured to determine the current duty cycle each time it plans to transmit a downlink frame.

Optionally, the data collection unit may be configured to classify the downlink frame in N different classes, wherein a priority i and a duty cycle share $DC_i$ is associated to each class, wherein $i \in \{0, \ldots, N-1\}$, wherein the duty cycle limit to be applied for the $i^{th}$ class is a maximum duty cycle minus the sum of duty cycle shares $DC_j$ of any pending classes j with higher priority, wherein $j \in \{0, \ldots, i-1\}$. Preferably, the duty cycle limit is dynamically adapted when the number of pending classes j with higher priority changes.

Optionally, the data collection unit may be configured to send the classified downlink frame to the at least one of the measuring devices during an access opportunity only if there is no other access opportunity provided by another uplink data frame of another measuring device that requires a classified downlink frame with a higher priority that would at least partly overlap in time.

Optionally, the data collection unit may be configured to receive one or more classified end-to-end downlink frames from a head-end system (HES) and to transmit the classified end-to-end downlink frames to at least one of the measuring devices during an access opportunity only if the current duty cycle does not exceed a duty cycle limit, wherein the duty cycle limit depends on a prioritization of the class of the end-to-end downlink frames.

Optionally, the data collection unit may be configured to terminate the end-to-end communication by receiving an acknowledgement uplink data frame from said at least one of the measuring devices.

Optionally, the data collection unit may be configured to classify end-to-end downlink frames of an ongoing end-to-end communication as the highest priority downlink data frames.

Optionally, the data collection unit may be configured to classify end-to-end downlink frames to have a higher priority than maintenance downlink frames.

Embodiments of the present disclosure will now be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIGS. 2a and 2b are views showing schematically different situations a bi-directional communication according to the LAT principle between a data collection unit and a measuring device in connection with the first aspect disclosed herein;

DESCRIPTION OF PREFERRED EMBODIMENTS

Figure 1:
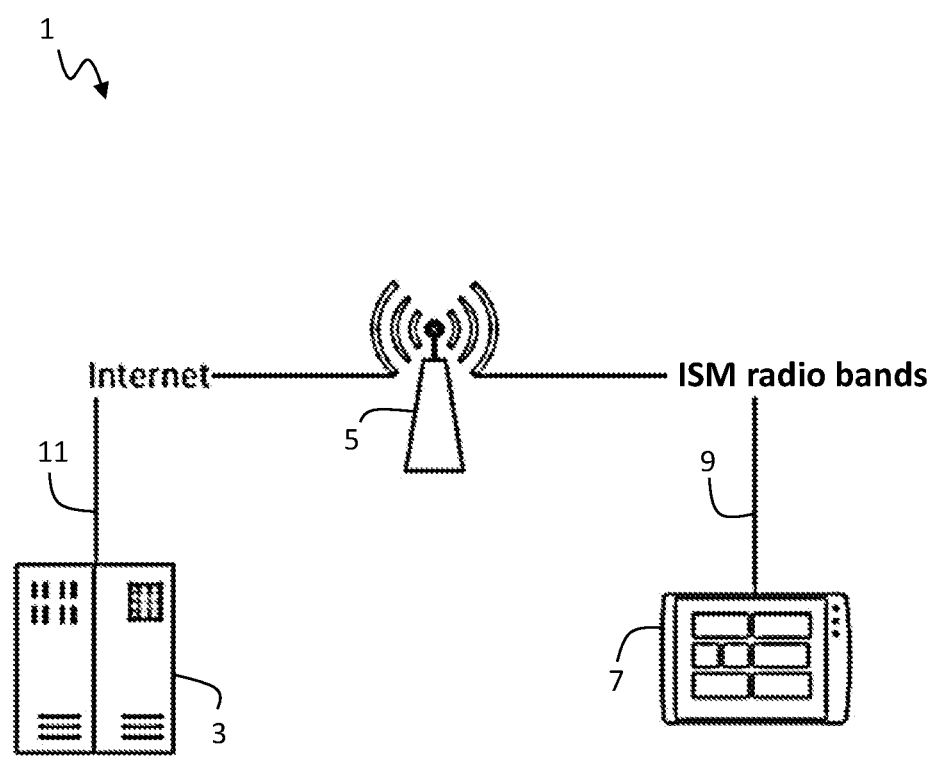
FIG. 1 is a schematic view of a meter reading system comprising an example of a data collection unit and of a measuring device disclosed herein.

FIG. 1 shows schematically a meter reading system 1 comprising a head-end system (HES) 3, a data collection unit 5, and a measuring device 7 in form of a consumption meter. The measuring device 7 may be a consumption meter for registering a consumption of water, gas and/or thermal energy at a utility installation, e.g. a private household, a public facility, or an industry facility. The measuring device 7 may alternatively be an alarm sensor, an acoustic noise detector, a chemical sensor, a turbidity sensor, a remotely controlled valve or another kind of monitoring device that is supposed to send regularly information to the HES 3. The HES 3 receives and processes information from and/or controls the behaviour of a multitude of measuring devices 7 that are installed in a multitude of utility installations.

The measuring device 7 communicates wirelessly with the data collection unit 5 using license-free ISM radio bands 9. The HES 3 is connected to the data collection unit 5 via an internet connection 11, preferably by wire or fibre optics. A multitude, e.g. several thousand, of other measuring devices 7 may communicate with one data collection unit 5 in a star topology. The HES 3 may be connected to a plurality of distributed data collection units 5.

The measuring device 7 may comprise a microcontroller, e.g. a central processing unit (CPU), a digital signal processor (DSP) or a field programmable gate array (FPGA), a permanent or volatile storage medium, e.g. a RAM, a radio interface, a battery, and preferably a human-machine-interface (HMI), e.g. comprising a display, a touchscreen, a button and/or a switch. A sensor module for measuring or detecting a value at a utility installation may be integrated into the measuring device 7 or connected to it by wire or wirelessly. The measuring device 7 may comprise a metering unit and a Meter Transmission Unit (MTU) connected to the metering unit. The value may be indicative of a physical quantity, such as a fluid flow or a heat flow through a pipe the sensor module is mounted on. The measuring device 7 is configured to continuously, regularly, or sporadically store the measured or detected value with or without a time stamp. Alternatively, or in addition, the measuring device 7 may be configured to process, e.g. sum up, the measured or detected value and to store the processed value, e.g. a cumulative value, such as a consumed volume of water, gas or energy.

The microcontroller of the measuring device 7 is configured to power-up the radio interface according to a data transmission schedule, e.g. hourly or daily. The radio interface may be at least partly integrated into the microcontroller or a completely separate electronic module. In order to save as much battery power as possible, the radio interface is only powered for as long as it is needed for establishing the ISM radio communication 9 and transmitting data to the data collection unit 5. The data may comprise all or parts of the stored measured, detected or processed value with or without a time stamp and identification data for identifying the measuring device 7 or the sensor module, or the utility installation respectively. The data may be encrypted and authenticated using symmetric or asymmetric cryptographic methods and algorithms including message authentication codes.

As illustrated in FIG. 2a, the communication between the measuring device 7 and the data collection unit 5 is bidirectional according to a "Listen-After-Talk" (LAT) principle. This means that the communication is always initiated by the measuring device 7. The measuring device 7 transmits an uplink frame 13 to the data collection unit 5 and opens its radio interface for reception of a downlink frame from the data collection unit 5 at a defined point in time (T) relative to the uplink frame transmitted by the measuring device 7. The timing (T) of the time-limited access opportunity, i.e. "listening window", may be indicated in the uplink frame 13 transmitted by the measuring device 5. The listening window may also be referred to as access opportunity (AO). The measuring device 7 does not necessarily provide an AO after each uplink frame 13. For instance, the second, third and fifth uplink frame 13 do not provide an AO, whereas the first and fourth does. The interval between AOs may be determined based on a compromise between what latency in the bidirectional communication is acceptable and what energy consumption in the measuring device 7 is acceptable. A large interval between AOs will result in a large latency, but it requires less energy consumption in the measuring device 7, because the radio receiver of the measuring device 7 is less active. A shorter interval between AOs reduces latency, but increases the energy consumption in the measuring device 7. In the example shown in FIG. 2a, the data collection unit 5 uses the second given AO for sending a downlink frame 15 to the measuring device 7. The downlink frame 15 may be part of end-to-end communication originated from the HES 3 and transmitted to the measuring device 7 via the data collection unit 5. Alternatively, the downlink frame 15 may be part of link management originated from the data collection unit 5 in order to maintain or improve the current communication with the measuring device 7

As can be seen in FIG. 2b, the data collection unit 5 does not need to use any given AO for a downlink frame. In fact, the majority of AOs remain unused, because there is a maximum, e.g. 10%, allowed downlink duty cycle set by authoritative regulations when a license-free ISM radio band is used. Therefore, the data collection unit 5 wants to save as much downlink communication as possible and leaves many AOs unused. However, the measuring device 7 needs every now and then a confirmation or any form of downlink frame to know whether the uplink frames are received by the data collection unit or not. If the measuring device 7 has not successfully received a downlink frame for a certain amount of time or a certain number of AOs provided have not been used or unsuccessfully used, it cannot trust that its uplink frames were actually received by the data collection unit 5. In this situation, it increases its uplink budget, e.g. sending with a higher power, to reach the data collection unit 5. This is referred to as "fallback". In normal operation, in order to save battery-energy in the measuring device 7, the link management attributes just the uplink budget to a measuring device 7 it needs to reach the data collection unit 5. The maximum uplink budget may be used only by the measuring devices 7 furthest away from the data collection unit 5 or with the high path losses due to their location (e.g. deeply indoor or underground), whereas other measuring devices 7 may use a lower uplink budget in normal operation. A fallback is therefore costly in terms of battery-energy and should be prevented. This undesirable situation is shown in FIG. 2b. The uplink frames 13 of the measuring device 7 reach the data collection unit 5, i.e. there is no need for a fallback. However, the data collection unit 5 has not responded for some reason. The measuring device 7 counts the number of consecutively unused or unsuccessfully used AOs it has provided by a fallback counter value (FC). FC is a countdown value starting at a start value of 200 in this example. The measuring device 7 is programmed to trigger a fallback action, i.e. increase its uplink budget, when FC is down to zero, i.e. after 200 consecutively unused or unsuccessfully used AOs it has provided. FC may be reset to 200 after the fallback. After fallback, the measuring device 7 consumes unnecessary battery-power for sending with increased or even maximum uplink budget. The fallback may be performed stepwise, i.e. a soft fallback to increase the uplink budget to a first level may be performed before the a hard feedback to the a second level, e.g. maximum, uplink budget is performed.

Figure 3:
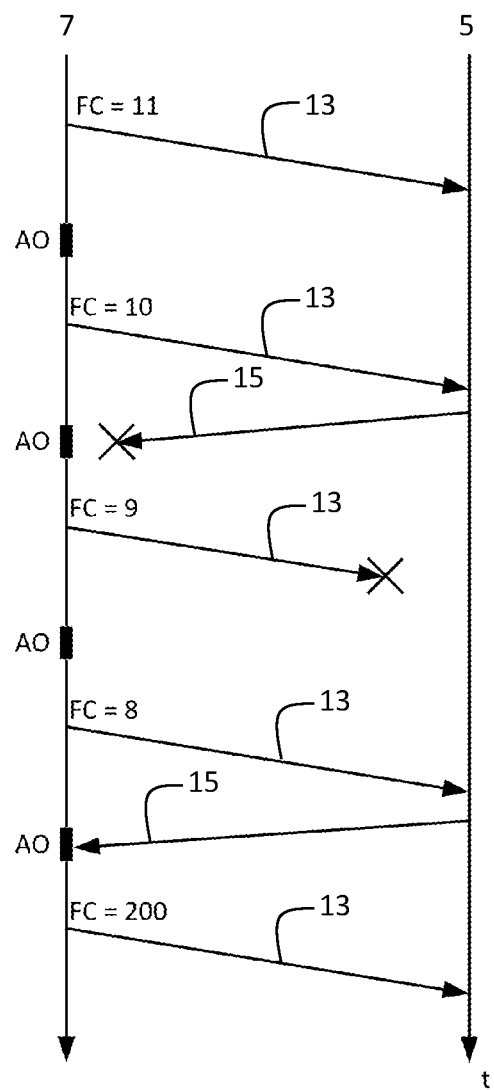
FIG. 3 is a schematic view showing a successful prevention of a fallback action in connection with the first aspect disclosed herein.

FIG. 3 shows a solution to prevent such a fallback according to a first aspect disclosed herein. The uplink frames 13 in FIG. 3 contain an urgency indicator based on FC and the data collection unit 5 prioritises using AOs provided by uplink frames 13 indicating that the measuring device 7 is close to a fallback. Here, the urgency indicator is FC itself. For instance, the measuring device 7 may know that it usually does not need more than ten AOs to reach a measuring device 7, so that an urgency threshold may be set 10. Thus, it can save downlink budget by not using any AOs provided by uplink frames 13 with an FC larger than the urgency threshold of 10. If the urgency indicator indicates that FC is at 10 or below, it uses the AO for a downlink frame. The downlink frame may be a simple OK for the measuring device 7 to keep its settings or it may contain settings to improve the link quality or save uplink budget. In the example shown in FIG. 3, the downlink frame 15 responding to FC=10 does not reach the measuring device 7, so the attempt to use the associated AO is not successful. The next uplink frame 13 indicates FC=9 does not reach the data collection unit 5, so the data collection unit 5 does not know of the following AO. The next uplink frame 13 indicating FC=8 reaches the data collection unit 5, which causes the data collection unit 5 to repeat the downlink frame 15 that was previously unsuccessful, optionally with higher transmission power. This downlink frame 15 is successfully received by the measuring device 7 which resets FC to 200 without triggering a fallback. The data collection unit 5 can send a downlink frame 15 with a command to set the FC start value to another value, permanently or temporarily. This is useful if certain circumstances make it difficult for the data collection unit 5 to seize at least one AO successfully within the maximum counting distance given by the FC start value.

Figure 4:
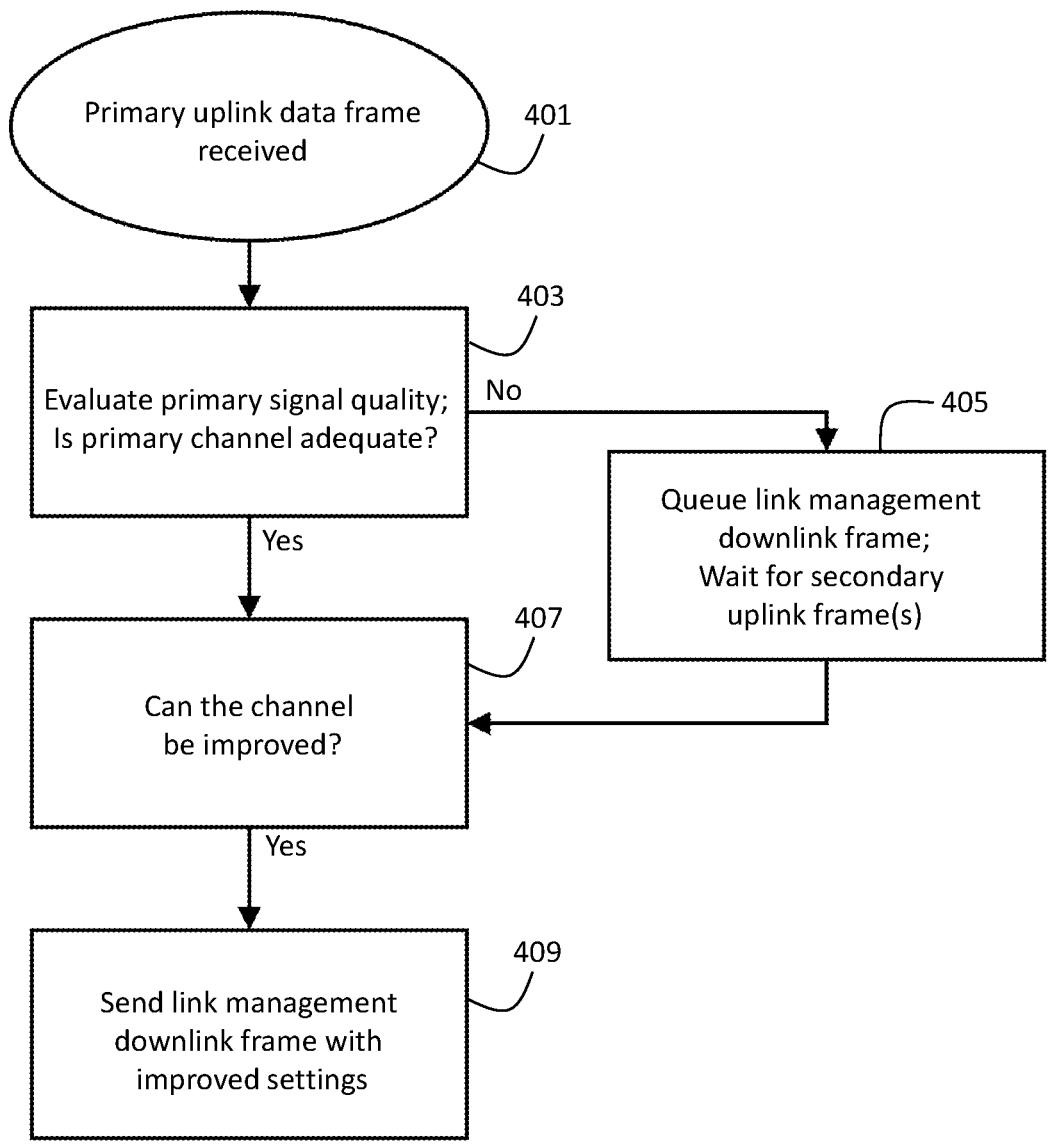
FIG. 4 is a flow diagram of method steps after receiving a primary uplink frame by the data collection unit in connection with the second aspect disclosed herein.

FIG. 4 shows a flow diagram of method steps after receiving a primary uplink frame by the data collection unit 5 in connection with the second aspect disclosed herein. The measuring device 7 may send via a primary communication channel a regular reading data set by a primary uplink frame that reaches the data collection unit 5 in step 401. The signal quality of the primary uplink frame, i.e. a primary signal quality, is evaluated by the data collection unit in following step 403. For example, the signal-to-noise ratio may be determined and evaluated. For example, the primary signal quality may be compared with a pre-determined quality threshold or with other signal qualities, e.g. secondary signal qualities as described below for FIG. 5. If the primary signal quality is not adequate, e.g. below the pre-determined quality threshold or other signal qualities are more adequate, the AO provided by the primary uplink frame is not used for a link management response. Instead, it is queued in step 405 to wait for secondary uplink frames (see FIG. 5). It should be noted that the most adequate signal quality may not be the highest signal quality. In fact, a too high signal quality may come at the cost of link budget, so that the most adequate signal quality in light of the link budget is preferably considered. For instance, it may be beneficial to queue the AO provided by the primary uplink frame if one of the secondary uplink frames achieves the same or a lower, but sufficient secondary signal quality with less link budget. Operating at a lower link budget saves battery-energy in the measuring device, decreases congestion in the radio channels and relieves the data collection unit from resource consuming calculations related to demodulating and decoding data frames received in high link budget channels. So, it is preferred that the data collection unit selects the AO provided by the uplink data frame with the lowest signal quality above a pre-determined quality threshold among the primary signal quality and the one or more secondary signal qualities.

If the primary signal quality is sufficient, e.g. above the pre-determined quality threshold or above other signal qualities, the AO provided by the primary uplink frame may be used for a link management response in optional step 407. Even if the signal quality of the primary channel is sufficient or no more adequate signal quality is available, there may be room for improvements. In optional step 409, the link management downlink frame is sent to the measuring device 7 in the AO provided by the primary uplink frame. Steps 407 and 409 are optional, because it is not essential to improve a sufficient signal quality in the primary channel.

Figure 5:
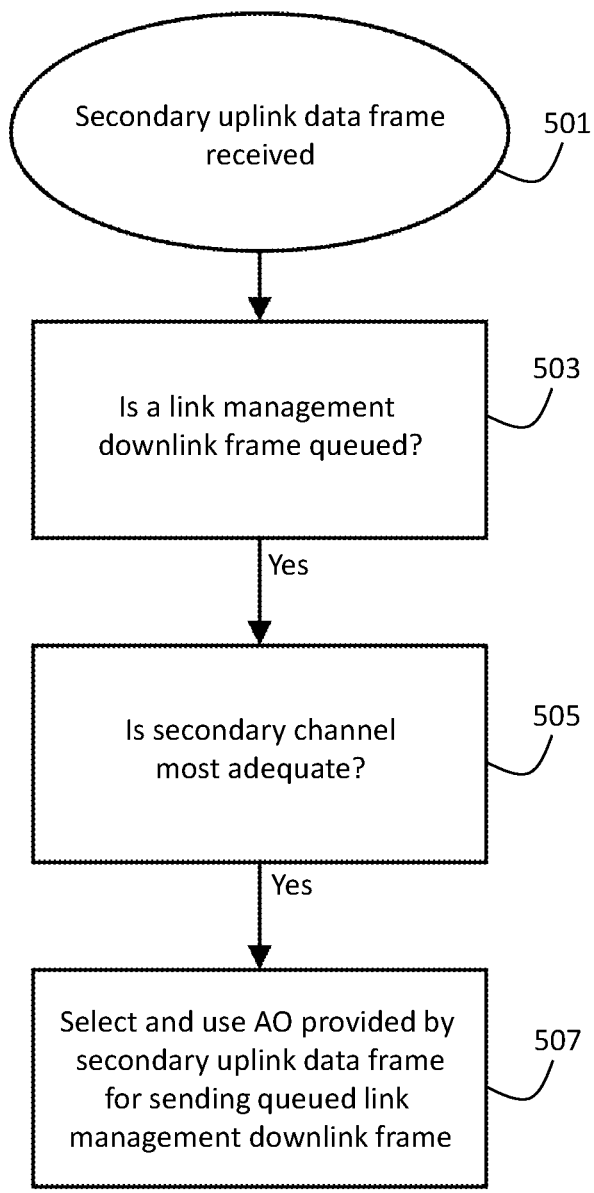
FIG. 5 is a flow diagram of method steps after receiving a secondary uplink frame by the data collection unit in connection with the second aspect disclosed herein.

As shown in FIG. 5, the measuring device 7 sends one or more secondary uplink frames to the data collection unit 5 that receives the secondary uplink frame in step 501. Sending of secondary uplink frames is preferably less often than sending primary uplink frames. For instance, every 10$^{th}$ primary uplink frame may be followed by one or more secondary uplink frames. A secondary uplink frame is a kind of test frame using another communication mode or channel than the primary uplink frame, i.e. a secondary channel. The secondary uplink frame may contain little or no data, but provides an AO for the data collection unit 5 to use for a response. In following step 503, it is checked if a link management downlink frame was queued in step 405. The data collection unit 5 may ignore the secondary uplink frame if no link management downlink frame was queued in step 405. If, however, a link management downlink frame was queued in step 405, the signal quality of the one or more secondary uplink frames, i.e. the secondary signal quality, is in step 505 evaluated and compared with the primary signal quality determined in step 403 and other secondary signal qualities if applicable. If the secondary signal quality is more adequate than the primary signal quality or other secondary signal qualities, i.e. most adequate, the AO provided by the secondary uplink frame is used for sending the queued link management response in step 507. This is a clear indication for the measuring device 7 to use the associated secondary channel as the new primary channel for sending primary uplink frames from now on. There is no further communication needed to find a channel agreement.

Figure 6:
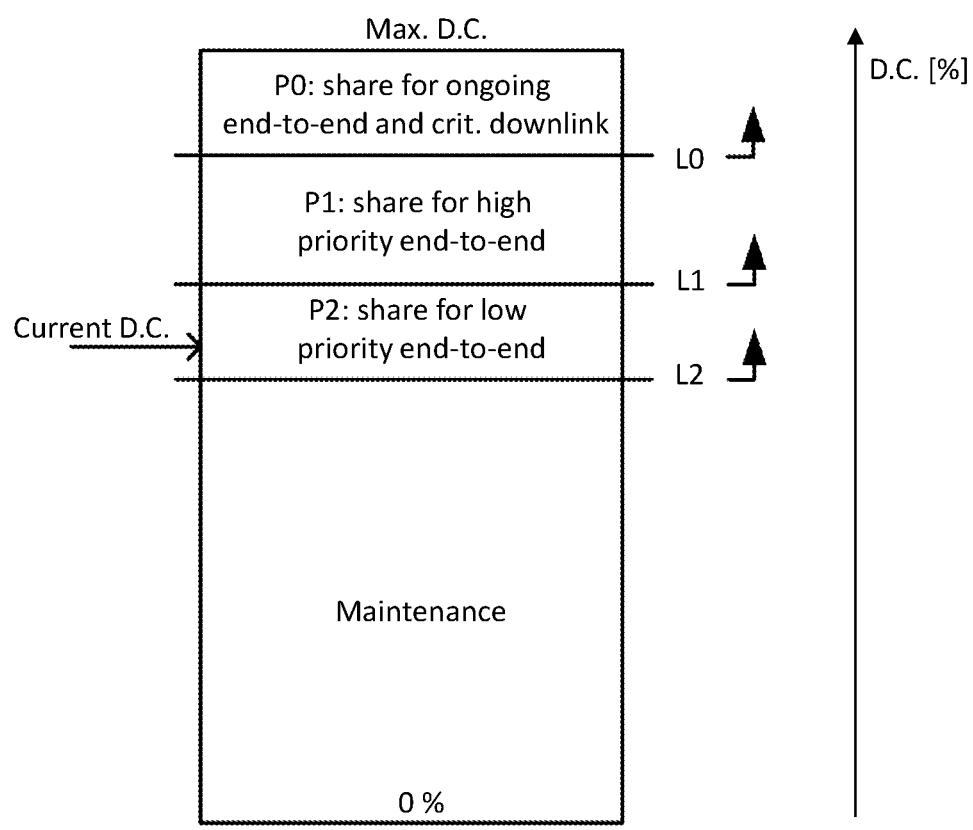
FIG. 6 is a schematic view showing duty cycle limits based on a prioritization scheme in connection with the third aspect disclosed herein.

FIG. 6 shows schematically duty cycle limits based on a prioritization scheme in connection with the third aspect disclosed herein. The solution is here to classify the downlink frames to be sent from the data collection unit 5 to the measuring device 7 and to send a classified downlink frame to the measuring device in an AO only if a current duty cycle does not exceed a duty cycle limit, wherein the duty cycle limit depends on a prioritization of the class of the downlink frame. A coarse classification of downlink frames is here as follows:

| | |
|---|---|
| Critical downlink traffic | High priority link management downlink traffic, e.g. traffic that is necessary to prevent a measuring device from sending with maximum uplink budget (e.g. triggering fallback) |
| Maintenance downlink traffic | Low priority link management downlink traffic, e.g. traffic that optimizes the link between a measuring device and a data collection unit. |
| Privileged downlink traffic | End-to-end downlink traffic queued in the data collection unit that is addressed to a measuring device but not yet scheduled/transmitted to a measuring device. |
| Ongoing downlink traffic | Any traffic necessary to finish already started end-to-end downlink traffic until the final acknowledgement in a sequence is received from the measuring device |

In general, the downlink frame is classified in N different classes, wherein $N \in \mathbb{N}$. A priority i and a duty cycle share $DC_i$ is associated to each class, wherein $i \in \{0, \ldots, N-1\}$, wherein the duty cycle limit to be applied for the i$^{th}$ class is a maximum duty cycle minus the sum of duty cycle shares $DC_j$ of any pending classes j with higher priority, wherein $j \in \{0, \ldots, i-1\}$. FIG. 6 shows an example for N=4 downlink frame classes.

The following definitions are used to describe the algorithm:

Max D.C.: The maximum duty cycle allowed for the data collection unit to use, e.g. the duty cycle limitation set by authoritative regulations.

Current D.C. [0-Max D. C]: The current downlink duty cycle determined over a sliding time window (e.g. one hour).

Priority [P0 . . . PK]: Priority of the downlink traffic, where K=N−2 is an integer value greater than or equal to 1

P0—Active frames: e.g. critical downlink traffic and ongoing downlink traffic

P1: Highest priority frames (e.g. of privileged downlink traffic)

PK: Lowest priority frames (e.g. of privileged downlink traffic) Maintenance: Example: Maintenance downlink traffic Duty cycle limits [L0 . . . LK]: Exceeding a limit will restrict the downlink traffic to classified downlink traffic of according priority or higher, where K=N−2 is an integer value greater than or equal to 1

L0: Priority P0 limit

L1: Priority P1 limit

LK: Priority PK limit.

FIG. 6 shows the full available duty cycle range between 0% and Max D.C., which is set by authoritative regulations.

The current D.C. may therefore take any value between 0% and Max D.C. depending on the current downlink traffic load of the data collection unit 5. For each downlink traffic, the duration of the transmission is used to update the current duty cycle. The transmission time may differ among downlink frames, even for the same frame size the transmission time can be different depending on the link parameters used by the data collection unit to reach the measuring device.

The highest duty cycle limit L0 below Max D.C. is defined by a duty cycle share below Max D.C. associated with the class of P0 frames, such that only the class P0 of ongoing end-to-end downlink traffic and critical downlink traffic is sent if the current D.C. is at or above L0. This means that only P0 downlink frames are submitted as long as they are queuing. The rationale is here, firstly, to finish any ongoing end-to-end downlink traffic in order to avoid retransmission, and secondly, to perform critical link management in order to avoid fallback activity.

The second-highest duty cycle limit L1 below L0 is defined by a duty cycle share below L0 associated with the class of P1 frames, such that only the class P0 or the class P1 of high priority end-to-end downlink traffic is sent if the current D.C. is at or above L1. It should be noted that there is no prioritisation between P0 and P1 when the current D.C. is between L1 and L0.

The third-highest duty cycle limit L2 below L1 is defined by a duty cycle share below L1 associated with the class of P2 frames, such that only the classes P0, P1 or P2 is sent if the current D.C. is at or above L2, wherein P2 is the class of low priority end-to-end downlink traffic. It should be noted that there is no prioritisation between P0, P1 and P2 when the current D.C. is between L2 and L1. If the current D.C. is as shown above L2, no maintenance downlink traffic is sent until there is no more P0, P1 and P2 downlink traffic to send. If the current D.C. is below L2, no prioritisation is applied and maintenance downlink traffic or any other downlink traffic is sent as scheduled.

Figure 7:
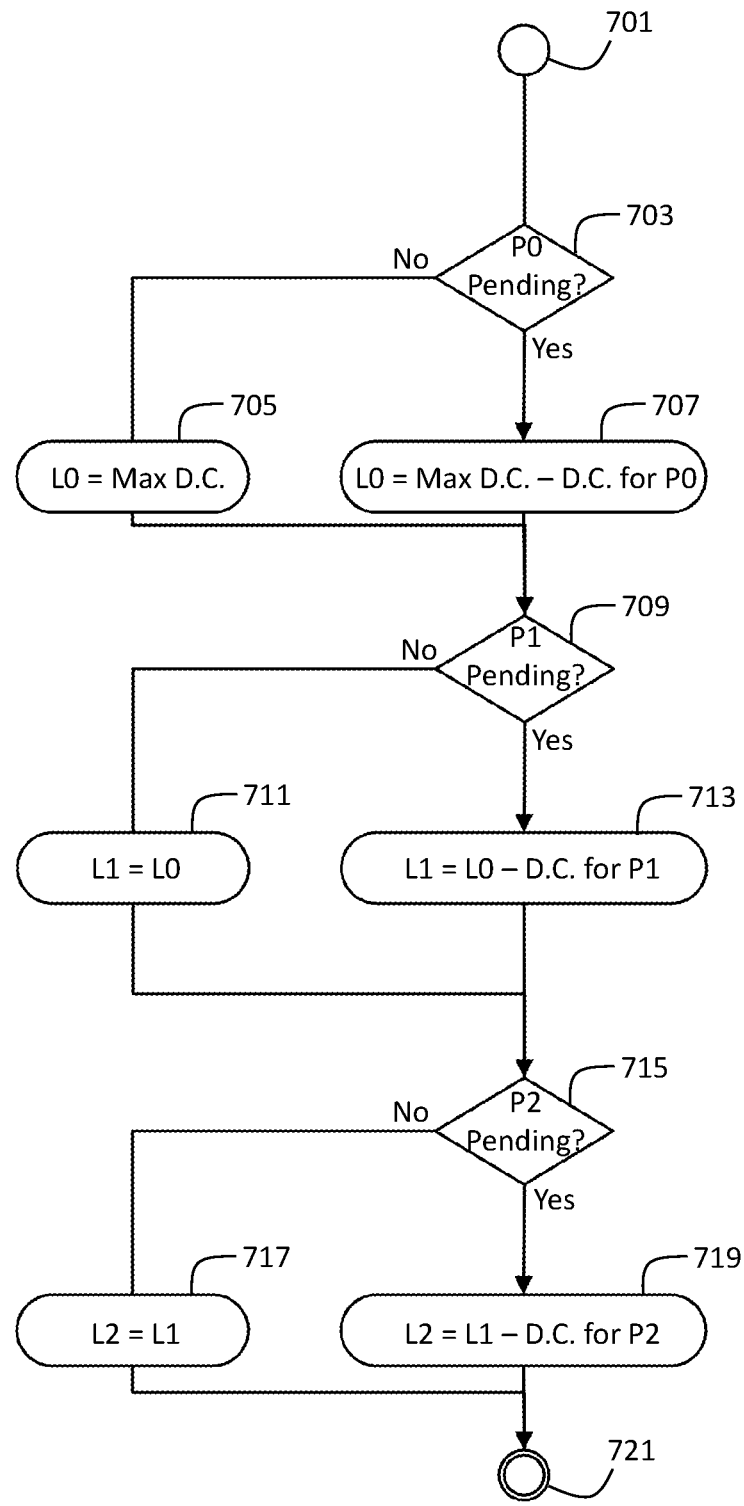
FIG. 7 is a flow diagram of method steps for setting the duty cycle limit to apply in connection with the third aspect disclosed herein.

FIG. 7 shows a flow diagram of method steps for setting the duty cycle limits L0-LK, which are dynamically adapted when the number of pending classes with higher priority changes. In step 701, the data collection unit 5 either receives end-to-end communication from the HES 3 or an uplink frame from a measuring device 7. In the first case, there is new privileged downlink traffic pending. In the latter case, the uplink frame may contain information that link management is critical to avoid a fallback action, e.g. by a counter value according to the first aspect disclosed herein. In any case, the data collection unit 5 may update the prioritization scheme and duty cycle L0-LK as shown in FIG. 7. In following step 703, it is checked if any P0 downlink traffic is pending, i.e. critical downlink traffic or ongoing end-to-end downlink traffic. If this is not the case, L0 is set to Max D.C. in step 705. If it is the case, a certain share of duty cycle reserved for P0 downlink frames is subtracted from Max D.C. to set L0 in step 707. The share of duty cycle reserved for P0 downlink frames may be a configurable pre-determined value.

In following step 709, it is checked if any P1 downlink traffic is pending, i.e. high priority end-to-end traffic. The HES 3 may label the end-to-end communication as "high priority". If this is not the case, L1 is set to L0 in step 711. If it is the case, a certain share of duty cycle reserved for P1 downlink frames is subtracted from L0 to set L1 in step 713. The share of duty cycle reserved for P1 downlink frames may also be a configurable pre-determined value.

Analogously, in following step 715, it is checked if any P2 downlink traffic is pending, i.e. low priority end-to-end traffic. The HES 3 may label the end-to-end communication as "low priority". If this is not the case, L2 is set to L1 in step 717. If it is the case, a certain share of duty cycle reserved for P2 downlink frames is subtracted from L1 to set L2 in step 719. The share of duty cycle reserved for P2 downlink frames may also be a configurable pre-determined value. The prioritization scheme update ends with step 721 when K=N−2 duty cycle limits are set.

Figure 8:
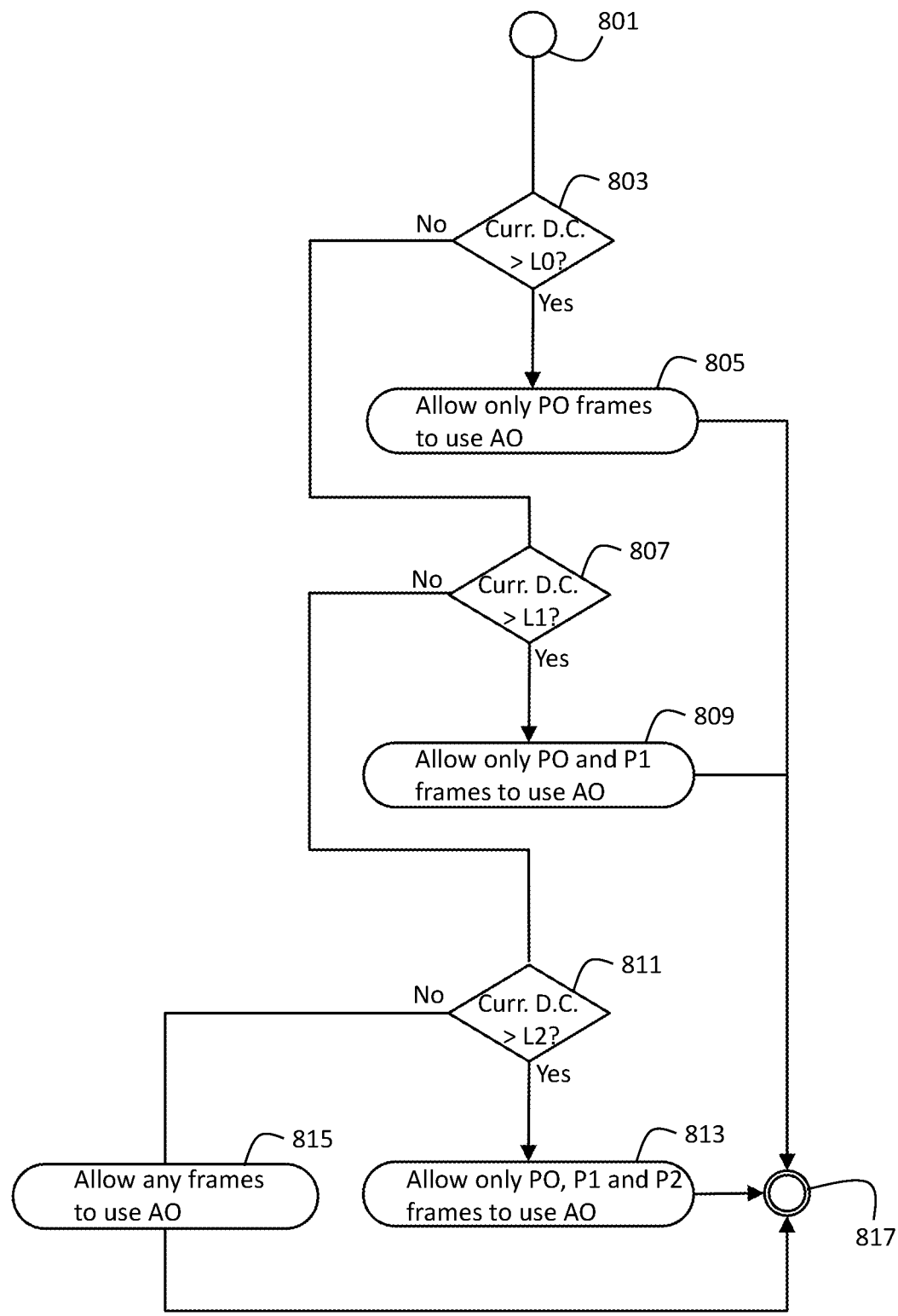
FIG. 8 is a flow diagram of method steps for using access opportunities in connection with the third aspect disclosed herein.

FIG. 8 shows a flow diagram of method steps for using access opportunities. In step 801, the data collection unit 5 receives an uplink frame from a measuring device 7, wherein said uplink frame provides an AO that the data collection unit 5 can use to respond to the measuring device 7. In following step 803, it is checked if the current D.C. is above the limit L0. If it is, only P0 downlink frames are allowed to use the AO in step 805. If it is not the case, it is checked in step 807 if the current D.C. is above the limit L1. If it is, only P0 and P1 downlink frames are allowed to use the AO in step 809. If it is not the case, it is checked in step 811 if the current D.C. is above the limit L2. If it is, only P0, P1 and P2 downlink frames are allowed to use the AO in step 813. If it is not the case, any downlink frames are allowed to use the AO to communicate to the measuring device 7. In step 817, the allowed use of the AO is actually performed to communicate to the measuring device 7.

Figure 9:
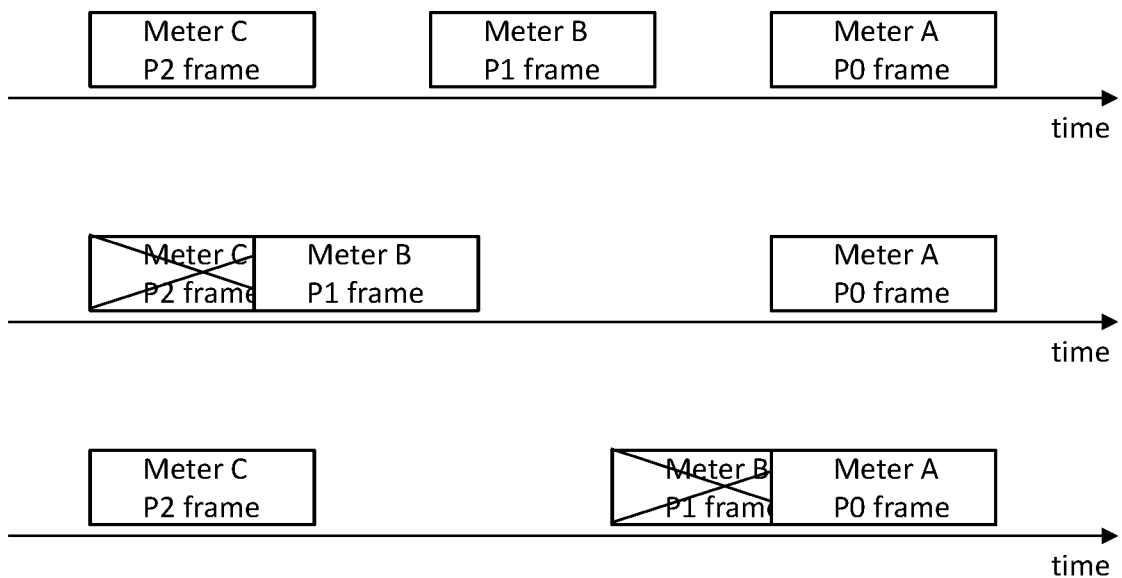
FIG. 9 is a schematic view showing a conflict resolution in connection with the third aspect disclosed herein.

FIG. 9 shows schematically a conflict resolution based on the priority scheme in connection with the third aspect disclosed herein. As the data collection unit 5 handles communication with a multitude of measuring devices 7, timing conflicts may arise among the different downlink frames to be send if AOs of different consumption meters partly or fully overlap. In the top diagram of FIG. 9, the current D.C. is below L1 and allows P0, P1 and P2 downlink frames. The AOs of the different meters A,B,C do not overlap and no timing conflict arises. The P2 frame is sent to meter C, then the P1 frame is sent to meter B and the P0 frame is sent to meter A according to schedule. In the diagram in the middle of FIG. 9, however, the AO for meter B overlaps partly with the AO for meter C. The data collection unit 5 could not start sending the P1 frame to meter B, because sending the P2 frame to meter C would still be ongoing. In this case, the data collection unit 5 prioritises the higher priority P1 frame to meter B and rejects using the AO of meter C. In the lower diagram, the AOs of meter A and meter B partly overlap. Again, the higher priority P0 frame is prioritised above the P1 frame, so that using the AO of meter B is rejected.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above aspects and embodiments are to be understood as illustrative examples of the disclosure. It is to be understood that any feature described in relation to any one aspect or embodiment may be used alone, or in combination with other features described, and may also be used in combination with one or more features of any other of the aspects or embodiments, or any combination of any other of the aspects or embodiments. While at least one exemplary aspect or embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary aspects or embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 meter reading system
3 HES
5 data collection unit
7 measuring device
9 ISM radio connection
11 internet connection
13 uplink frame
15 downlink frame
401 receiving primary uplink frame
403 evaluating primary signal quality
405 queue link management downlink frame
407 check for link improvements
409 use primary AO for link improvements
501 receiving secondary uplink frame
503 check if link management downlink frame is queued
505 check if secondary signal quality is most adequate
507 use secondary AO for link management downlink frame
701 start update duty cycle limits L0-LK
703 check if P0 frames are pending
705 set L0 to Max D.C.
707 set L0=Max D.C.–D.C. share for P0 frames
709 check if P1 frames are pending
711 set L1=L0
713 set L1=L0–D.C. share for P1 frames
715 check if P2 frames are pending
717 set L2=L1
719 set L2=L1–D.C. share for P2 frames
721 end update duty cycle limits
801 receiving an uplink frame providing an AO
803 check if current D.C. is above L0
805 allow only P0 frames to use AO
807 check if current D.C. is above L1
809 allow only P0 and P1 frames to use AO
811 check if current D.C. is above L2
813 allow only P0, P1 and P2 frames to use AO
815 allow any frames to use AO
817 use AO with allowed frames
FC counter value

What is claimed is:

1. A method for link management for wireless communication between a measuring device, installed to measure or detect a value at a utility installation, and a data collection unit for collecting data from the measuring device, the method comprising the steps of:
sending data in a primary uplink data frame from the measuring device to the data collection unit via a primary channel;
providing by the measuring device, after sending the primary up-link data frame, a time-limited primary access opportunity for receiving a link management downlink frame from the data collection unit;
evaluating a primary signal quality upon receiving the primary uplink data frame via the primary channel;
sending one or more secondary uplink data frames from the measuring device to the data collection unit via one or more secondary channels;
providing by the measuring device, after sending of at least some of the secondary uplink data frames, a time-limited secondary access opportunity for receiving the link management downlink frame from the data collection unit;
evaluating one or more secondary signal qualities upon receiving the one or more secondary uplink data frames via the one or more secondary channels;
selecting one among the primary access opportunity and the one or more secondary access opportunities for sending the link management downlink frame from the data collection unit to the measuring device depending on the evaluation of the primary signal quality and the evaluation of the one or more secondary signal qualities; and
using, after receiving said link management downlink frame during the selected access opportunity from the data collection unit, an associated channel as the primary channel for sending data in another primary up-link data frame from the measuring device to the data collection unit.

2. The method according to claim 1, wherein the access opportunity provided by the primary uplink data frame or one of the secondary uplink data frames with the lowest signal quality above a pre-determined quality threshold among the primary signal quality and the one or more secondary signal qualities is selected.

3. The method according to claim 1, wherein the one or more secondary uplink data frames are shorter than the primary uplink data frame.

4. The method according to claim 1, wherein the sending of the one or more secondary uplink data frames occurs less frequently than the sending of the primary uplink data frame.

5. The method according to claim 1, wherein the primary signal quality and/or the one or more secondary signal qualities are determined based on a signal-to-noise ratio or based on a signal-to-interference-plus-noise ratio or based on both on a signal-to-noise ratio and a signal-to-interference-plus-noise ratio.

6. The method according to claim 1, wherein the primary channel or the one or more secondary channels or both the primary channel and the one or more secondary channels differ among each other by any one of a group comprising: a center frequency of a frequency band; a symbol rate; a bandwidth; a modulation type; and modulation parameters.

7. The method according to claim 1, wherein the primary channel or the one or more secondary channels or the primary channel and the one or more secondary channels differ among each other by the modulation type of any one of a group comprising: binary phase key shifting; Gaussian frequency shift keying; Gaussian minimum shift keying; and chirp modulation or variants of any one of binary phase key shifting, Gaussian frequency shift keying, Gaussian minimum shift keying and chirp modulation.

8. The method according to claim 1, wherein the primary channel or the one or more secondary channels or the primary channel and the one or more secondary channels differ among each other by any one of a group comprising: using direct sequence spread spectrum; using chirp spread spectrum; and using frequency hopping spread spectrum.

9. A data collection unit for wirelessly collecting data from a plurality of measuring devices wherein each of the measuring devices is installed to measure or detect a value at a respective utility installation, wherein the data collection unit comprises:
   a receiver; and
   a processor, wherein the receiver is configured to receive data in a primary uplink data frame from at least one of the measuring devices via a primary channel, wherein the primary uplink data frame indicates a time-limited primary access opportunity provided by the at least one of the measuring devices for receiving a link management down-link frame from the data collection, wherein the processor is configured to evaluate a primary signal quality upon receiving the primary uplink data frame via the primary channel, the receiver being further configured to receive one or more secondary uplink data frames from the at least one of the measuring devices via one or more secondary channels, wherein at least some of the secondary uplink data frames indicate a time-limited secondary access opportunity provided by the at least one of the measuring devices for receiving the link management down-link frame from the data collection unit, the processor being further configured to evaluate one or more secondary signal qualities upon receiving the one or more secondary uplink data frames via the one or more secondary channels, the processor being further configured to select one among the primary access opportunity and the one or more secondary access opportunities for sending the link management down-link frame to the at least one of the measuring devices depending on the evaluation of the primary signal quality and the one or more secondary signal qualities, so that an associated channel is used as the primary channel for receiving data in another primary uplink data frame from the at least one of the measuring devices.

10. The data collection unit according to claim 9, wherein the processor is further configured to select the access opportunity provided by the primary uplink data frame or the one or more the secondary uplink data frames with the lowest signal quality above a pre-determined quality threshold among the primary signal quality and the one or more secondary signal qualities.

11. The data collection unit according to claim 9, wherein the data collection unit further comprises a transmitter, wherein the receiver is further configured to receive data in a primary uplink data frame from the at least one of the measuring devices via one of the secondary channels after the transmitter has sent the link management downlink frame to the at least one of the measuring devices in an associated access opportunity.

12. The data collection unit according to claim 9, wherein the processor is configured to determine the primary signal quality or the one or more secondary signal qualities or the primary signal quality and the one or more secondary signal qualities based on a signal-to-noise ratio or a signal-to-interference-plus-noise ratio or a signal-to-noise ratio and a signal-to-interference-plus-noise ratio.

13. The data collection unit according to claim 9, wherein the primary channel or the one or more secondary channels or the primary channel and the one or more secondary channels differ among each other by any one of a group comprising: a center frequency of the frequency band; a symbol rate; a bandwidth; a modulation type; and modulation parameters.

14. The data collection unit according to claim 9, wherein the primary channel or the one or more secondary channels or the primary channel and the one or more secondary channels differ among each other by a modulation type of any one of a group comprising: binary phase key shifting, Gaussian frequency shift keying, Gaussian minimum shift keying, and chirp modulation or variants thereof.

15. The data collection unit according to claim 9, wherein the primary channel or the one or more secondary channels or the primary channel and the one or more secondary channels differ among each other by any one of a group comprising: using direct sequence spread spectrum; using chirp spread spectrum; and using frequency hopping spread spectrum.

16. A data collection unit for wirelessly collecting data from a plurality of measuring devices wherein each of the measuring devices is installed to measure or detect a value at a respective utility installation, wherein the data collection unit comprises:
   a first electronic component configured to receive data in a primary uplink data frame from at least one of the measuring devices via a primary channel, wherein the primary uplink data frame indicates a time-limited primary access opportunity provided by the at least one of the measuring devices for receiving a link management down-link frame from the data collection;
   a second electronic component configured to evaluate a primary signal quality upon receiving the primary uplink data frame via the primary channel, the first electronic component being further configured to receive one or more secondary uplink data frames from the at least one of the measuring devices via one or more secondary channels, wherein at least some of the secondary uplink data frames indicate a time-limited secondary access opportunity provided by the at least one of the measuring devices for receiving the link management down-link frame from the data collection unit, the second electronic component being further configured to evaluate one or more secondary signal qualities upon receiving the one or more secondary uplink data frames via the one or more secondary channels, the second electronic component being further configured to select one among the primary access opportunity and the one or more secondary access opportunities for sending the link management down-link frame to the at least one of the measuring devices depending on the evaluation of the primary signal quality and the one or more secondary signal qualities, so that an associated channel is used as the primary channel for receiving data in another primary uplink data frame from the at least one of the measuring devices.

* * * * *